United States Patent
Camacho Perez et al.

(10) Patent No.: US 10,348,355 B2
(45) Date of Patent: Jul. 9, 2019

(54) TECHNIQUES FOR GESTURE RECOGNITION USING PHOTOPLETHYSMOGRAPHIC (PPMG) SENSOR AND LOW-POWER WEARABLE GESTURE RECOGNITION DEVICE USING THE SAME

(71) Applicant: Intel Corporation, Santa Clara, CA (US)

(72) Inventors: Jose Rodrigo Camacho Perez, Guadalajara Jalisco (MX); Hector Raul Moncada Gonzalez, Guadalajara (MX); Hector Alfonso Cordourier Maruri, Guadalajara (MX); Julio Cesar Zamora Esquivel, Zapopan (MX); Paulo Lopez Meyer, Tlaquepaque (MX); Alejandro Ibarra Von Borstel, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/855,746

(22) Filed: Sep. 16, 2015

(65) Prior Publication Data

US 2017/0075426 A1     Mar. 16, 2017

(51) Int. Cl.
G06F 3/01 (2006.01)
H04B 1/40 (2015.01)
G06F 1/16 (2006.01)

(52) U.S. Cl.
CPC ............... *H04B 1/40* (2013.01); *G06F 1/163* (2013.01); *G06F 3/015* (2013.01); *Y02D 70/00* (2018.01)

(58) Field of Classification Search
CPC ........... G06F 1/163; G06F 3/014; G06F 3/017
See application file for complete search history.

(56) References Cited

U.S. PATENT DOCUMENTS 6,285,211 B1 * 9/2001 Sample ............ H03K 19/17744
326/39
8,856,875 B2   10/2014 Aditya
(Continued)

FOREIGN PATENT DOCUMENTS

KR      20110068579 A   *   6/2011
KR   10-2012-0080852 A       7/2012
(Continued)

OTHER PUBLICATIONS

International Search Report issued in PCT Application No. PCT/US2016/047206, dated Oct. 27, 2016, 12 pages.
(Continued)

*Primary Examiner* — Dong Hui Liang
(74) *Attorney, Agent, or Firm* — Grossman, Tucker, Perreault & Pfleger, PLLC

(57) ABSTRACT

A wearable gesture recognition device is disclosed that provides gesture recognition for gestures that may include a hold or steady-state component, and may account and adapt for real-time fit-level changes. The wearable gesture recognition device may integrate a photoplethysmographic (PPMG) and a piezoelectric (PZE) sensor such that respective sensor signals may be used individually, or in concert for gesture recognition. Thus the wearable gesture recognition device generally disclosed herein may advantageously perform gesture recognition through the fusion of PPMG and PZE signals. To support continuous gesture recognition, the wearable gesture recognition device may use a low-power activity detection scheme that analyzes a PZE signal prior to higher-power gesture classification. Moreover, the wearable gesture recognition device may provide power management by controlling a duty-cycle of the PPMG sensor without necessarily reducing recognition perfor-
(Continued)

mance. The PPMG sensor and the PZE sensor may be co-located and housed within a same sensor package.

9 Claims, 28 Drawing Sheets

(56) References Cited

U.S. PATENT DOCUMENTS

| | | | |
|---|---|---|---|
| 2003/0153831 A1* | 8/2003 | Zumeris | A61B 5/033 600/437 |
| 2006/0140422 A1 | 6/2006 | Zurek et al. | |
| 2010/0331649 A1 | 12/2010 | Chou | |
| 2011/0049579 A1* | 3/2011 | Dumitru | B82Y 10/00 257/254 |
| 2011/0308323 A1* | 12/2011 | Oizumi | G01L 9/0042 73/721 |
| 2013/0159705 A1 | 6/2013 | Leedom, Jr. | |
| 2013/0242262 A1 | 9/2013 | Lewis | |
| 2013/0326253 A1* | 12/2013 | Lam | G06F 1/3206 713/323 |
| 2014/0028546 A1* | 1/2014 | Jeon | G06F 3/014 345/156 |
| 2014/0275852 A1* | 9/2014 | Hong | A61B 5/02427 600/301 |
| 2014/0297217 A1 | 10/2014 | Yuen | |
| 2014/0378113 A1* | 12/2014 | Song | G06F 3/014 455/418 |
| 2015/0031964 A1* | 1/2015 | Bly | A61B 5/165 600/301 |
| 2015/0074797 A1 | 3/2015 | Choi et al. | |
| 2015/0135310 A1* | 5/2015 | Lee | A61B 5/681 726/20 |
| 2015/0160622 A1* | 6/2015 | Kim | G04G 21/02 368/9 |
| 2015/0185838 A1 | 7/2015 | Camacho-Perez et al. | |
| 2015/0289820 A1* | 10/2015 | Miller | A61B 5/7221 600/300 |
| 2016/0018872 A1* | 1/2016 | Tu | G06F 1/3234 345/173 |
| 2016/0070245 A1* | 3/2016 | Lee | G05B 15/02 700/49 |
| 2016/0091980 A1* | 3/2016 | Baranski | A61B 5/7475 345/156 |
| 2016/0246368 A1 | 8/2016 | Camacho-Perez et al. | |
| 2016/0282945 A1 | 9/2016 | Ochoa | |
| 2016/0282947 A1* | 9/2016 | Schwarz | G06F 1/163 |
| 2016/0284135 A1 | 9/2016 | Zamhi | |
| 2016/0378193 A1 | 12/2016 | Rodrigo | |
| 2017/0078788 A1 | 3/2017 | Meyer | |
| 2017/0090583 A1 | 3/2017 | Zamora Esquivel et al. | |

FOREIGN PATENT DOCUMENTS

| | | |
|---|---|---|
| KR | 10-2013-0035290 A | 4/2013 |
| WO | 2015123771 A1 | 8/2015 |

OTHER PUBLICATIONS

Tamura, Toshiyo, et al.,: "Wearable Photoplethysmographic Sensors—Past and Present", Electronics, No. 3, 2014, pp. 282-302, DOI:10.3390/electronics3020282.

H. Han, J. Kim, "Artifacts in wearable photoplethysmographs during daily life motions and their reduction with least mean square based active noise cancellation method", Computers in biology and medicine, 42(4), Apr. 2012, pp. 387-393, Abstract only.

K.F. Teng, Y.T. Zhang, "The effect of contacting force on photoplethysmographic signals", Physiological Measurement, No. 25, Aug. 11, 2004, pp. 1323-1335, Abstract only.

G. Park, C.R. Farrar, A. C. Rutherford, A.N. Robertson, "Piezo-Sensor Self-Diagnostics Using Electrical Impedance measurements", Los Alamos National Laboratory, Technical Report LA-UR-04, Oct. 24-27, 2004, 17 pages.

Myo Armband, https://www.thalmic.com/myo, downloaded Mar. 22, 2017, 5 pages.

Chianura, A., et al.: "Electrooptical muscle contraction sensor", Medical & biological engineering & computing, 48(7), pp. 731-734, Jul. 2010, 12 pages.

Raghavendra, J.: "Optomyography: detection of muscle surface displacement using reflective photo resistor", MSc. Thesis, KTH Technology and Health, Stockholm, Aug. 2014, pp. 1-31.

Cheng, E.Y., et al: "Forehead pulse oximetry compared with finger pulse oximetry and arterial blood gas measurement", Journal of Clinical Monitoring, Jul. 4, 1988, vol. 4, Issue 3, pp. 223-226, Abstract only.

Barry, D.T., et al: "Acoustic myography as a control signal for an externally powered prosthesis", Archives of Physical Medicine and Rehabilitation, vol. 67, No. 4, Apr. 1986, pp. 267-269, Abstract only.

Overly, T.G., et al: "Piezoelectric active-sensor diagnostics and validation using instantaneous baseline data", IEEE Sensors Journal, vol. 9, No. 11, Nov. 2009, pp. 1414-1421, Abstract only.

Lim, J. M., et al: "Recognizing hand gestures using wrist shapes". In Consumer Electronics (ICCE), 2010 Digest of Technical Papers International Conference, IEEE, Jan. 2010, pp. 197-198, Abstract only.

Allan, A. A., et al: "Photoplethysmography". Best Practice & Research Clinical Anaesthesiology, 28(4), Dec. 2014, pp. 395-406, Abstract only.

Mason, W.P., et al.: "Methods for Measuring Piezoelectric, Elastic, and Dielectric Coefficients of Crystals and Ceramics", Proceedings of the IRE,vol. 42, Jun. 6, 1954, 1 page, Abstract only.

Harrison, Chris, et al.: "Skinput: Appropriating the Body as an Input Surface", http://www.chrisharrison.net/index.php/Research/Skinput, downloaded Mar. 22, 2017, 10 pages.

International Search Report and Written Opinion issued in PCT Application No. PCT/US2016/061420, dated Jan. 18, 2017, 15 pages.

Hakansson et al., "Resonance Frequencies of the Human Skull in Vivo Department of Applied Electronics", Chalmers University of Technology, Gothenburg, Sweden, Nov. 12, 1993, 9 pages.

Carter, et al., "Estimation of the Magnitude-Squared Coherence Function Via Overlapped Fast Fourier Transform Processing", IEEE Transactions on Audio and Electroacoustics, vol. AU-21, No. 4, Aug. 1973, 8 pages.

"Piezoelectric Sound Components", muRata catalogue, May 2014, 28 pages.

Welch, "The Use of Fast Fourier Transform for the Estimation of Power Spectra: A Method Based on Time Averaging Over Short, Modified Periodograms", IEEE Transactions on Audio and Electroacoustics, vol. AU-15, No. 2, Jun. 1967, pp. 70-73.

U.S. Office Action issued in U.S. Appl. No. 14/965,095, dated Oct. 21, 2016, 16 pages.

International Search Report and Written Opinion issued in PCT Application No. PCT/US2016/047089, dated Oct. 26, 2016, 12 pages.

Notice of Allowance issued in U.S. Appl. No. 14/854,927, dated May 9, 2017, 15 pages.

Office Action issued in U.S. Appl. No. 14/854,927, dated Sep. 1, 2016, 17 pages.

Notice of Allowance issued in U.S. Appl. No. 14/854,927, dated Sep. 18, 2017, 11 pages.

Notice of Allowance issued in U.S. Appl. No. 14/854,927, dated Nov. 6, 2017, 11 pages.

International Preliminary Report on Patentability and Written Opinion issued in PCT Application No. PCT/US2016/047206, dated Mar. 29, 2018, 10 pages.

\* cited by examiner

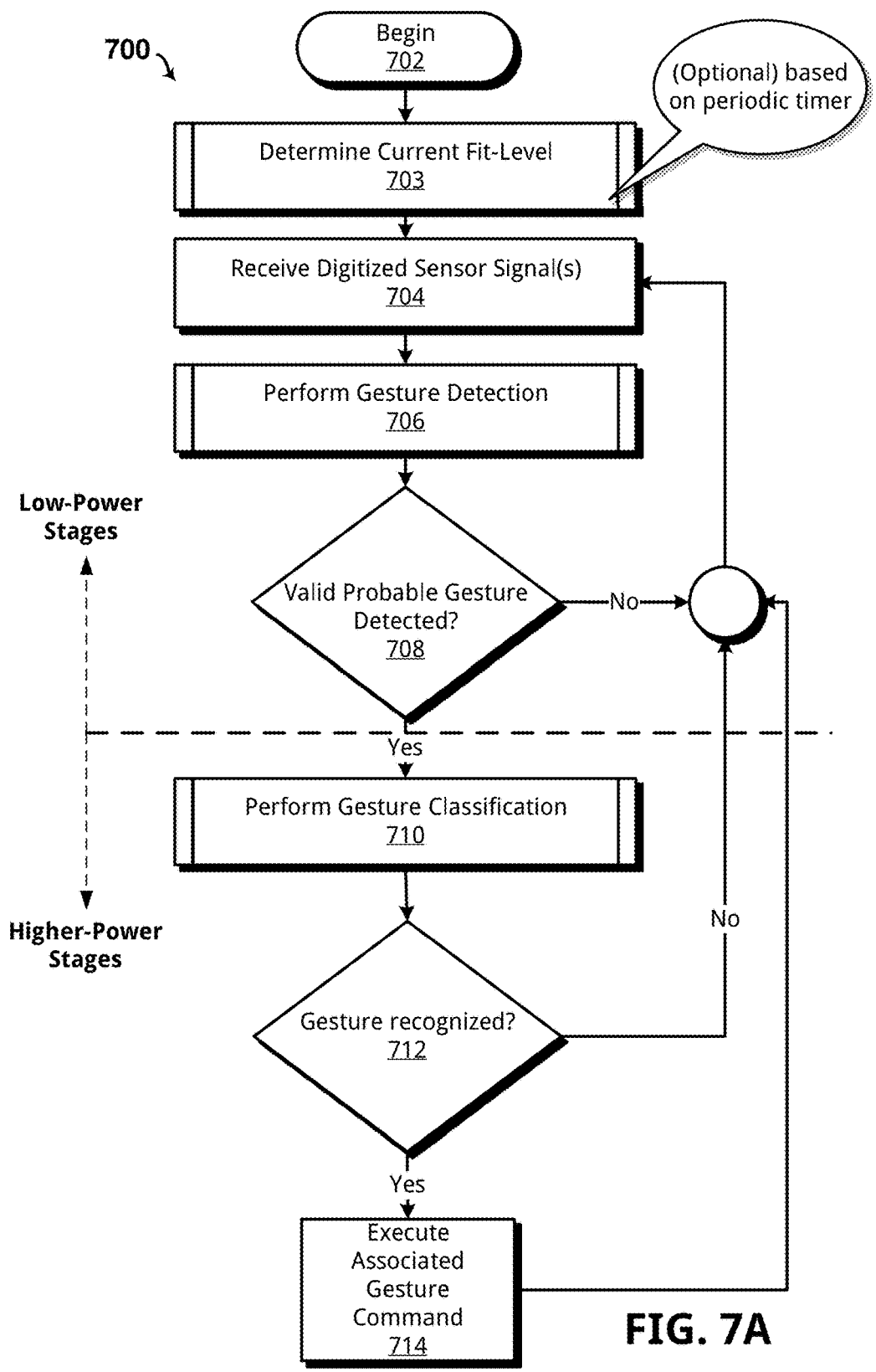

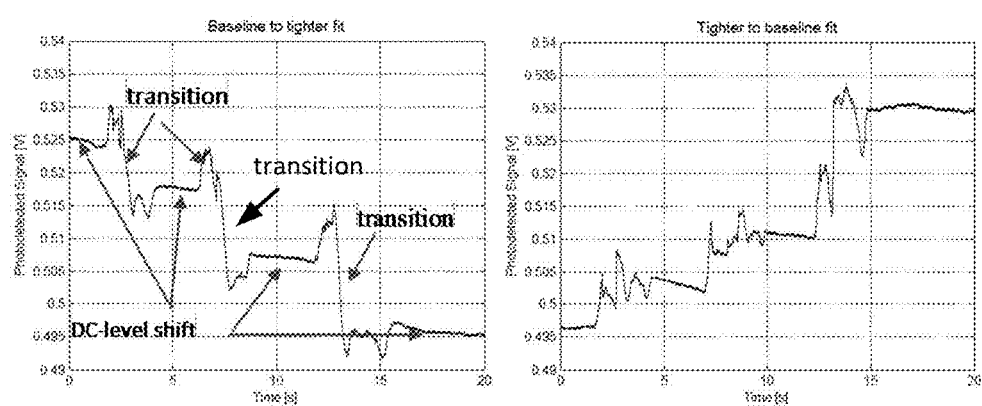
FIG. 9A          FIG. 9B

TECHNIQUES FOR GESTURE RECOGNITION USING PHOTOPLETHYSMOGRAPHIC (PPMG) SENSOR AND LOW-POWER WEARABLE GESTURE RECOGNITION DEVICE USING THE SAME

FIELD

The present disclosure is directed to hand gesture recognition, and more particularly, to hand gesture recognition using a hybrid sensor arrangement in a wearable device.

BACKGROUND

Wearable computing devices continue to increase in popularity, and feature increasingly sophisticated functionality including wireless capabilities. Ubiquitous to this trend are wearable computing devices that offer so-called "natural" input methods such as through voice and gesture recognition. Personal-assistant applications, internet browsing, and general device usage may be partly or entirely controllable by these natural input methods.

For practicality, wearable computing devices generally include small-form factor (SFF) designs that allow them to be unobtrusive, convenient, and aesthetically pleasing. However, SFF devices are naturally constrained in the areas of available space for electronic components, processing power, memory, and available power.

BRIEF DESCRIPTION OF THE DRAWINGS

FIG. 7A shows an example method for gesture detection using the wearable gesture recognition device of FIGS. 1A-1C, in accordance with an embodiment of the present disclosure.

FIGS. 9A-9B show example plots illustrating a dc-level shift resulting from tightening and loosening a wrist-band with a PPMG sensor, respectively, in accordance with an embodiment of the present disclosure.

Figure 1A:
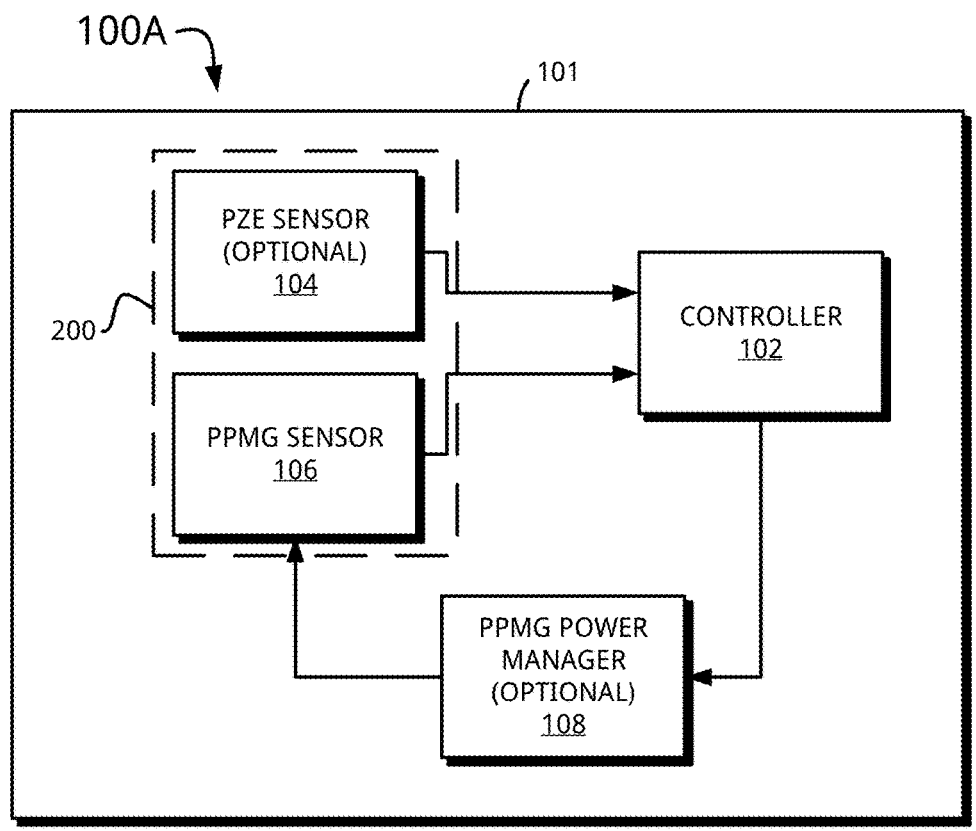
FIG. 1A illustrates a block diagram of a wearable gesture recognition device in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

As previously discussed, wearable computing devices may provide natural input methods such as voice commands and gesture recognition. Gesture recognition, in particular, may use one or more sensors to capture user gestures and a plurality of processing stages to, in a sense, "figure out" what command the user desires executing. These sensors and processing stages come at the expense of device resources such as processor cycles, memory, and power.

Some approaches to gesture recognition use piezoelectric (PZE) sensors that detect mechanical vibrations and output a proportional electrical signal that a device may use to recognize user gestures. The performance of gesture recognition using PZE sensors depends, in part, on fit-level, which generally refers to a sensor's tightness and position against a user's wrist or other worn location of the device such as upper arm, leg, foot, and so on. Increasing the number of sensors may improve gesture recognition performance. However, users may loosen, tighten, or otherwise reposition a wearable device, which can negatively impact gesture recognition performance.

Also, while PZE sensors perform particularly well when detecting gestures that are characterized by movement, such as clapping and finger-flicking, gestures with a "hold" component, or those that are based in part on a steady-state posture of a hand for example, lack the ability to provide enough movement for a PZE sensor to perform accurately. For example, a gesture such as a relaxed hand transitioning to a closed fist includes some movement but also includes a steady state hand posture (e.g., a closed fist), which cannot be adequately represented in a PZE signal for gesture recognition purposes. Such a gesture may otherwise provide, for instance, "drag-and-drop" command capability.

Thus, in accordance with an embodiment of the present disclosure, a wearable gesture recognition device is disclosed that provides gesture recognition for gestures that may include a hold or steady-state component, and may adapt to ongoing fit-level changes. The wearable gesture recognition device may integrate a photoplethysmographic (PPMG) and a PZE sensor such that respective sensor output signals may be used individually, or in concert, to perform gesture recognition. The combination of a PPMG and a PZE sensor signal may be generally referred to herein as a virtual sensor signal, or aggregate waveform. Thus the wearable gesture recognition device disclosed herein may advantageously perform gesture recognition through the fusion of PPMG and PZE signals.

To support continuous gesture recognition operation, the wearable gesture recognition device may use a low-power activity detection scheme that analyzes a PZE signal prior to higher-power gesture classification that may include the PZE signal, or the PPMG signal, or both. Moreover, the wearable gesture recognition device may provide power management by controlling a duty-cycle of an optical transmitter of the PPMG sensor without necessarily reducing gesture recognition performance. In an embodiment, the PPMG sensor and the PZE sensor are co-located and housed within a same sensor package/housing. The wearable gesture recognition device may comprise various physical form factors and styles including, for example, a watch device or other wearable computer device, such as a wrist-worn, leg-worn, eye-glass worn, or foot-worn computer device.

In accordance with an embodiment, a hybrid sensor device is disclosed and provides a PZE and a PPMG sensor in a single housing. The hybrid sensor device may include a PZE element with one or more openings configured to receive at least a portion of one or more PPMG sensors. The openings may be accurately referred to as a PPMG receptacle. While examples provided herein include a rounded PZE element, other shapes and configurations are also within the scope of this disclosure. The hybrid sensor device may be disposed on a surface of a watch opposite the face, thus providing close proximity to human tissue. As will be appreciated, other wearable clothing or computing devices may include the hybrid sensor, and this disclosure is not limited in this regard.

In one specific example embodiment, a wearable gesture recognition device is implemented in a smart watch or other wearable computing device and may exclusively use PPMG signals for gesture recognition. For example, the smart watch may continuously capture a PPMG signal and perform low-power analysis of the signal to detect probable gesture activity. Then, in the event activity is detected, the smart watch may perform gesture classification by comparing a PPMG signal against one or more reference signals that correspond to recognizable gestures. The reference signals may be predetermined or later "learned" by a training routine executed by the smart watch. In any event, a gesture recognized within the PPMG signal may cause the smart watch to execute an associated command locally, or send the associated command to a remote computing device. Some such commands may be, for example, mouse-clicks, virtual keyboard control, volume adjustments, and drag-and-drop, just to name a few. Thus the commands may be accurately described as a virtual keyboard, or virtual keyboard and mouse, although the commands are not necessarily limited to just keyboard and mouse activities. For example, commands may map to power-on/shutdown requests, volume control adjustments, and screen dimming.

Unlike a PZE sensor, the PPMG sensor optically detects changes in the blood flow volume and tissue displacement through emitting light and detecting changes in the light reflected back, and may output an electrical signal based on those detected changes. In the absence of changes (e.g., no hand movement), the signal detected remains at a DC voltage in proportion to the amount of light reflected in the adjacent tissue. When the tissue experiences a change such as, for example, blood saturation or tissue displacement, the detected light signal also changes accordingly, which gives rise to an AC component. In a more general sense, a PPMG signal provides a robust set of data points that allows gestures to be uniquely identified even when they include steady-state hand postures.

The smart watch may continuously perform gesture recognition using the PPMG signal. To conserve battery power, the PPMG power manager may switchably control a duty cycle of an optical transmitter of the PPMG sensor. In some cases, the PPMG power manager provides a duty cycle of about 20 Hz, or 20%, although other duty cycles will be apparent in light of this disclosure. For example, duty cycles of 10%, 25%, 50%, 80%, and so on, may also be suitable.

In another specific example embodiment, a wearable gesture recognition device is integrated in a smart watch or other wearable device and may include both a PZE sensor and a PPMG sensor. In this embodiment, the smart watch may continuously perform gesture recognition by performing gesture activity detection on the PZE signal. As should be appreciated, a PZE sensor generally uses less power than a PPMG sensor. Once activity is detected, the smart watch may perform higher-power classification routines. The classification routines may be performed on the PPMG signal alone, or using both the PPMG signal and the PZE signal. For example, the PZE signal and PPMG signal may be normalized and concatenated (aggregated) in a single waveform, generally referred to herein as a virtual sensor signal.

Gesture classification may then be performed using one or more reference signals, as described above. In addition, the smart watch may periodically determine a current fit-level based on, for example, the measured impedance of the PZE signal. In the event the smart watch determines the fit-level has changed (e.g., different from a previously determined fit-level), the smart watch may alert the user to increase/decrease tension between the PPMG sensor and the user's skin by tightening or loosening the wrist band, as the case may be. Alternatively, the smart watch may determine the fit-level has changed and automatically select reference signals that correspond to the determined fit level. Stated differently, the smart watch may perform gesture classification by selecting reference samples that match or otherwise approximate the current fit-level, and thus, may ensure gesture recognition performance.

As should be appreciated, any gesture that includes a recognizable PZE waveform or PPMG waveform, or both, is within the scope of this disclosure. A gesture, as generally referred to herein, may include any measurable human activity intended to convey meaning. Example gestures include, for example, finger pointing, hand raising, and finger tapping. In addition, a gesture may also include, for example, breathing, speaking, sneezing, coughing, and any other conscious/unconscious behavior of a human body. In one specific embodiment, the wearable gesture recognition device disclosed generally herein may be worn as an eyeglass computer and may be within operable proximity of tissue that may provide a PPMG signal with recognizable waveforms that characterize, for example, breathing. Such a device may control a computing device via gesture recognition, with different breaths being mapped to different commands, for example. Numerous other applications will be apparent in light of this disclosure.

In any event, Table 1 provides a non-limiting list of recognizable gestures and an associated description for the same for the purpose of clarity and reference.

TABLE 1

| Gesture | Example Description |
| --- | --- |
| Click | Index finger, middle finger, or both, strikes a surface such as a face surface of a wrist watch |
| Snap | Middle index finger pressed against thumb and released in sudden fashion in a downward motion towards palm |
| Close & Open | Relaxed hand in semi-open state transitioning to closed fist, and then back to semi-open state |
| Index/Pinky Flick | Hold index/pinky finger with thumb and suddenly release finger forward to the extended position |
| Thumb Flick | Hold thumb against index finger and suddenly release thumb forward to the extended position |
| Clap | Open-palmed hands colliding |

TABLE 1-continued

| Gesture | Example Description |
| --- | --- |
| Open Hold or Flex | Relaxed hand extended open and aligned with forearm, transitioning to fingers extended 90 degrees relative to forearm (palm facing up) |

Example Architecture and Operation

Various embodiments disclosed herein are directed to a wearable gesture recognition device that uses a photoplethysmography (PPMG) sensor during one or more stages of gesture recognition. Now turning to the Figures, FIG. 1A illustrates one such example. In particular, FIG. 1A shows a block diagram of a wearable gesture recognition device 100A, in accordance with an embodiment of the present disclosure. As shown, the wearable gesture recognition device 100A includes a housing 101, a controller 102, a piezoelectric (PZE) sensor 104, a PPMG sensor 106, and a PPMG power manager 108. FIG. 1A depicts the wearable gesture recognition device 100A in a highly simplified form, and it should be appreciated that different variations and permutations are also within the scope of this disclosure. The housing 101 may comprise various physical form factors and styles including, for example, a watch device or other wearable computer device, such as a wrist-worn, leg-worn, eye-glass worn, or foot-worn computer device.

The controller 102 may comprise, for example, a Complex Instruction Set Computer (CISC), a field-programmable gate array (FPGA), Reduced Instruction Set Computer (RISC) processor, x86 instruction set processor, multi-core, microcontroller, an application-specific integrated circuit ASIC, or central processing unit (CPU). In some embodiments, controller 102 may comprise dual-core processor(s), dual-core mobile processor(s), and so on. The controller 102 can include storage (not shown) such as non-volatile storage devices including flash memory and/or volatile storage devices such as Random Access Memory (RAM), Dynamic Random Access Memory (DRAM), and Static Ram (SRAM). The controller 102 can include or otherwise receive instructions that when executed cause one or more gesture recognition processes to be carried out, such as method 700 described below with respect to FIG. 7A.

Figure 13:
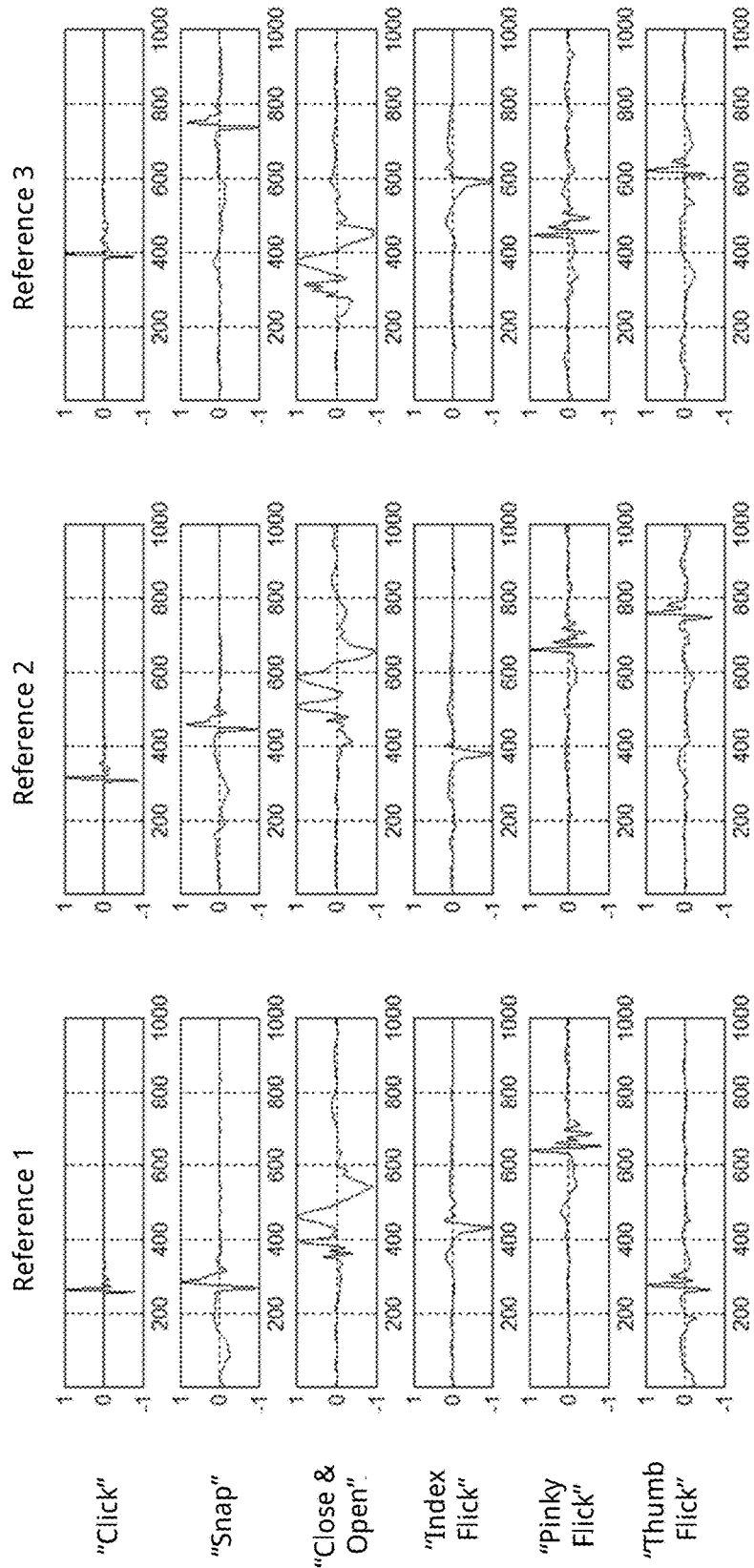
FIG. 13 shows a plurality of example reference PZE waveforms for use during performance of the classification method of FIGS. 7C-7D, in accordance with an embodiment of the present disclosure.

The PZE sensor 104 may comprise, for example, any sensor configured to sense mechanical vibration and output a proportional electrical signal. One particular non-limiting example of a PZE sensor is shown in the example embodiment of FIG. 3B, and is discussed in further detail below. The PZE sensor 104 may allow pressure or acceleration measurements, or both. In a general sense, the PZE 104 sensor registers mechanical vibrations and can produce electrical signals that serve as "signature" which may be used by the controller 102 to uniquely identify a particular gesture. For instance, a wrist-worn PZE sensor, such as housed within a smart watch device, may output a particular signal having unique characteristics as a user claps their hands together, or performs other such gestures. Some specific non-limiting example normalized PPMG signals are shown in FIG. 13, and correspond to a few example recognizable gestures.

As previously discussed, a PZE sensor signal is well suited for gestures that are characterizable or otherwise uniquely identifiable by their particular movement, or more precisely, by their unique pattern of mechanical vibration. To this end, a PZE signal is not as robust as the signal from the PPMG sensor 106 in some scenarios. However, because all hand gestures include at least some movement, the PZE sensor 104 may use that movement to trigger further gesture recognition processing. This means that the PZE sensor 104 may provide a relatively low-power option for detecting probable gesture activity prior to performance of higher-power gesture recognition processes, which seek to perform resource-intensive signal processing on a signal from the PPMG sensor 106. Further, it should be appreciated that PPMG sensors generally use more power than a PZE sensor, making PZE sensors particularly well suited for initial gesture detection that avoids or otherwise mitigates such costs.

Figure 3A:
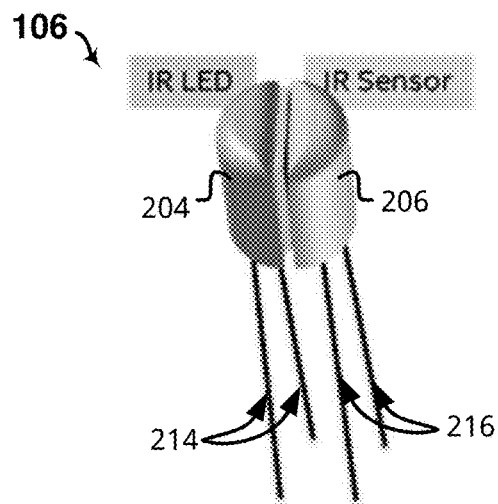
FIG. 3A shows a perspective view of a PPMG sensor for use in the hybrid sensor device of FIG. 2A, in accordance with an embodiment of the present disclosure.
Figure 12:
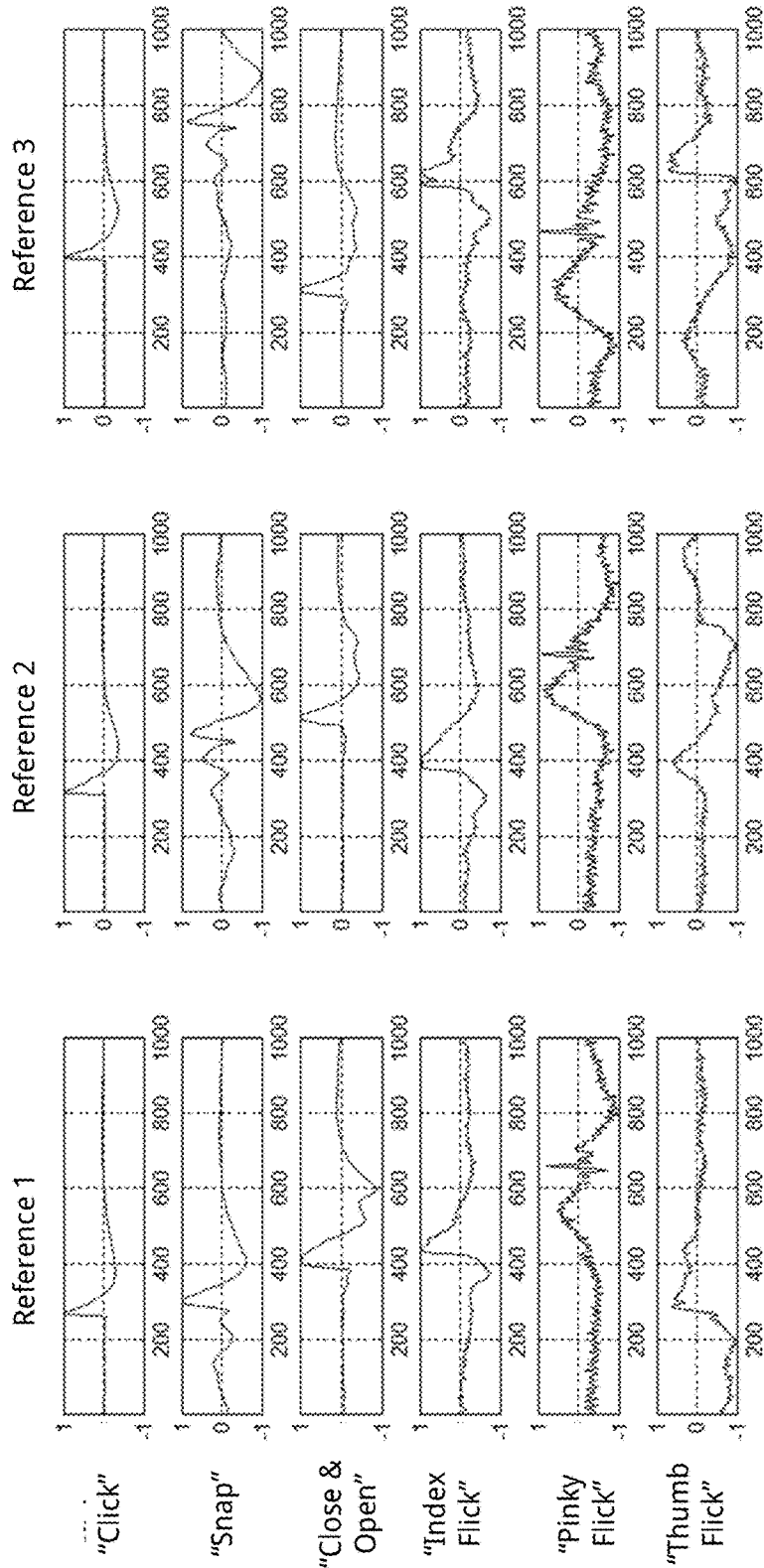
FIG. 12 shows a plurality of example reference PPMG waveforms for use during performance of the classification method of FIGS. 7C-7D, in accordance with an embodiment of the present disclosure.

The PPMG sensor 106 may comprise an infrared (IR) light emitting diode (LED) and an IR sensor or photodetector (PD). One particular non-limiting example of a PPMG sensor is shown in FIG. 3A, and discussed in greater detail below. The PPMG sensor 106 may optically detect changes in the blood flow volume through emitting light and detecting changes in the light reflected back. The PPMG sensor 106 may output an electrical signal based on those detected changes. For example, the PPMG sensor 106 may output a PPMG signal or waveform that includes a direct current (DC) representing generally steady-states, and an alternating current (AC) component representing movement. So, a PPMG signal may provide capabilities beyond a PZE signal. In particular, the PPMG signal advantageously provides a DC-level corresponding to steady states of adjacent tissue, with those steady states allowing the identification of particular fixed or otherwise steady-state hand postures. Some specific non-limiting example normalized PPMG signals are shown in FIG. 12 and correspond to a few example recognizable gestures.

Figure 11:
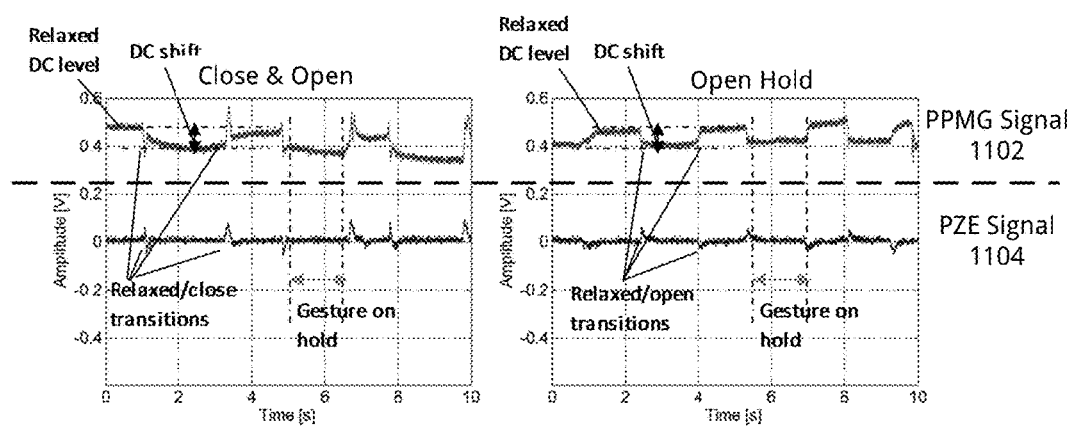
FIG. 11 shows two example plots that each illustrate the dc-shift of a PPMG signal during two different hold gestures, and juxtaposes the same with a time-synchronized PZE waveform for each respective different gesture, in accordance with an embodiment of the present disclosure.

Referring to FIG. 11, a plurality of example time-synchronized waveforms are shown for each of a PPMG signal 1102 and a PZE signal 1104, respectively, during consecutive gesture execution, in accordance with an embodiment the present disclosure. As shown in the PPMG signal 1102, a first DC level characterizes a hand in a "relaxed" position while a second DC level characterizes the hand transitioning into a gesture. In this specific example, the gestures shown include a Close & Open and a Open & Hold gesture, and by their nature include a "steady state" hand posture while being performed. As shown, this steady-state is represented by a measureable DC-shift in the PPMG signal 1102.

In some cases, the DC level of the PPMG signal 1102 may also allow gesture recognition in cases where an AC signal of the PPMG signal 1102 is weak or otherwise unreliable due to a minimum amount of hand movement. For example, a "tap" gesture may result in a weak or otherwise unpronounced varying signal, but the corresponding DC level may remain suitably identifiable for gesture recognition purposes.

As will be appreciated, gesture recognition based on PPMG signals require signal detection from a relatively low frequency to relatively high frequencies. Some gestures may be more complex to identify by using a PPMG or PZE signal alone, but easier for virtual signals which are essentially a combination of the two. For example, PZE signals corresponding to Flick and Tap gestures may look alike, but the corresponding time-synchronized PPMG signal for each are markedly differently and may allow differentiation between the two Likewise, gestures like Clap and Flex may provide PPMG AC signals that may look alike, but the corresponding time-synchronized PZE signal for each are distinguishable.

In any event, and as should be apparent in light of this disclosure, the DC level of the PPMG signal 1102 may allow those gestures that include a "hold" aspect to be recognized. Thus, commands such as "drag-and-drop" and other similar commands that benefit from a "hold" period may be performed based on those recognizable gestures and the amount of time the gesture remains in the "hold" state.

Figure 14:
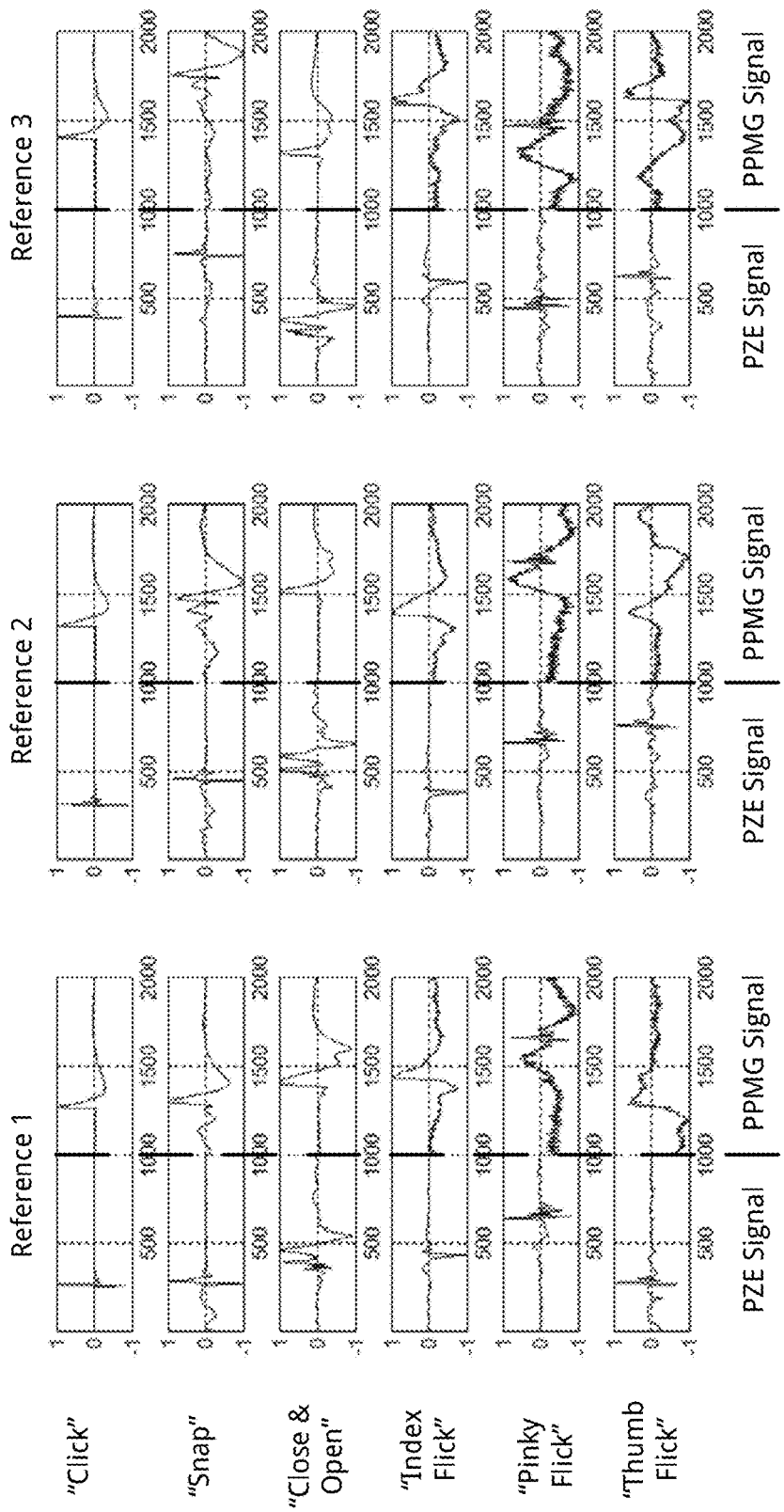
FIG. 14 shows a plurality of example reference virtual sensor waveforms for use during performance of the classification method of FIGS. 7C-7D, in accordance with an embodiment of the present disclosure.
Figure 15A:
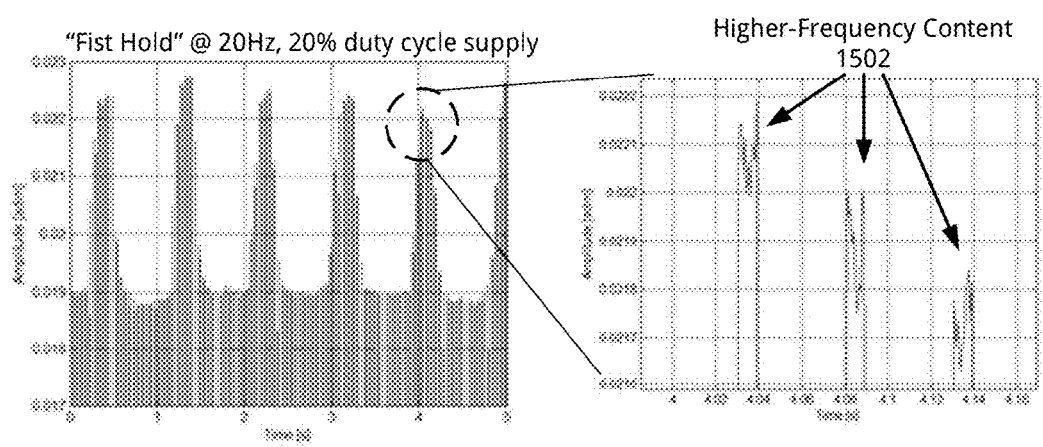
FIG. 15A shows an example plot illustrating a PPMG signal having a 20 Hz, 20% duty-cycle, in accordance with an embodiment of the present disclosure.
Figure 15B:
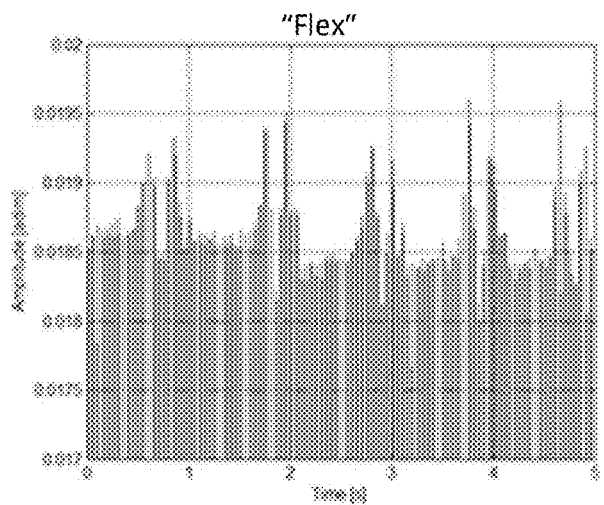
FIGS. 15B-15F show a plurality example plots each illustrating a PPMG signal having a 20 Hz, 20% duty cycle and representing a respective recognizable gesture, in accordance with an embodiment of the present disclosure.
Figure 15C:
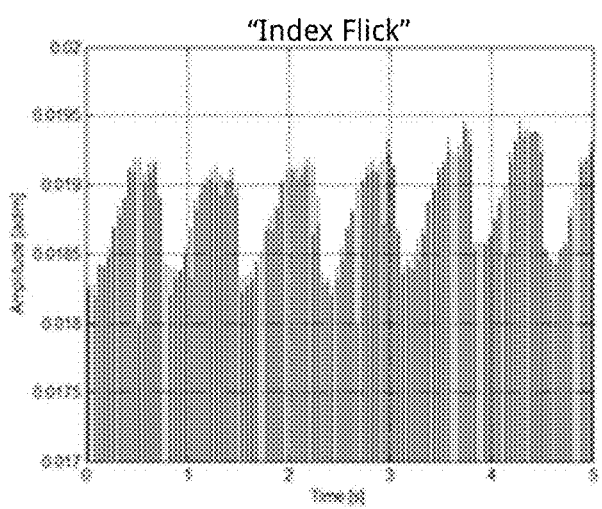
Figure 15D:
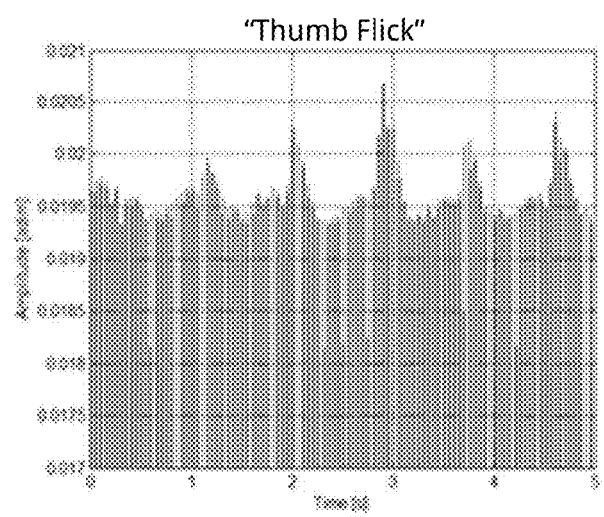
Figure 15E:
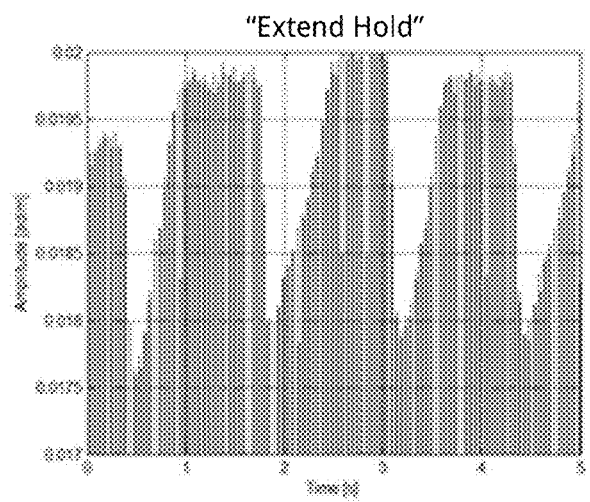
Figure 15F:
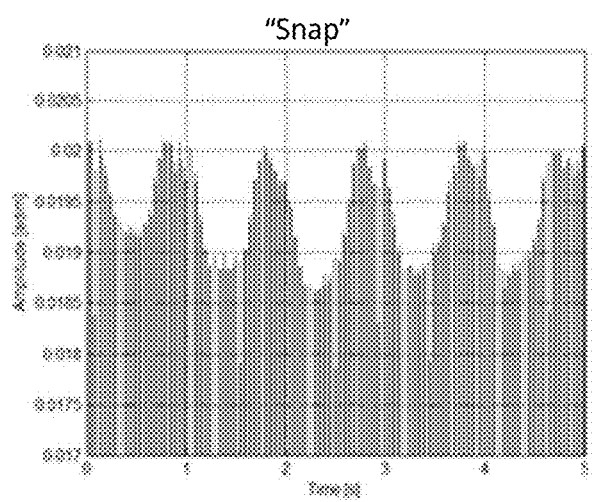

In an embodiment, the controller 102 may utilize a signal from the PZE in combination with a signal from the PPMG sensor 106 during gesture recognition processes to further enhance gesture recognition accuracy. Such a combination of a PZE signal and PPMG signal may generally be referred to herein as a virtual sensor signal, and is discussed in greater detail below. The controller 102 may normalize a time-synchronized portion of samples from the PZE signal and the PPMG signal to construct the virtual sensor signal. In one specific example, the controller 102 may normalize the signals and concatenate the time-synchronized signals such that a single waveform having both the PZE and PPMG component is generated. Some specific non-limiting example virtual sensor signals are shown in FIG. 14, and correspond to a plurality of example recognizable gestures.

Returning to FIG. 1A, the PPMG power manager 108 comprises hardware, circuitry, software, or any combination thereof that allows the PPMG power manager 108 to controllably cycle power to the IR LED of the PPMG sensor 106. In some cases the PPMG power manager includes a pulse width modulation circuit or device. For example, the PPMG power manager may directly provide or otherwise controllably apply a 20 Hz or 20% duty cycle to the PPMG sensor 106. The PPMG power manager 108 may include a plurality of selectable predetermined duty cycles. For example, the duty cycle may be selected based on the architecture of the system that implements the wearable gesture recognition device 100A. In any event, the duty cycle may range from at least about 10% to 50%, depending on desired energy savings and the particular PPMG sensor characteristics. Thus the PPMG power manager 108 reduces power consumption by cycling the supply power to the PPMG sensor 106, with the power savings being proportional to the duty-cycle of the supply signal.

FIGS. 15A-15F collectively show a plurality of PPMG signals captured at 20 Hz, or a duty cycle of 20%. As should be appreciated, each gesture may include a distinct or otherwise unique pattern and thus may be recognizable by correlation, such as using the method 700 of FIG. 7A. As shown, even at a 20 Hz/20% duty cycle the illustrated plots provide distinguishable waveforms, and thus, ample data points for gesture recognition. In addition, and as shown by the higher-frequency content 1502, the higher-frequency content of the signal may also provide sufficiently identifiable pattern to perform gesture recognition.

It should be noted that the gestures shown in FIGS. 15A-15F include a hand starting from a "relaxed" position, and after performing a particular gesture, returning to the "relaxed" position. The relaxed state may be different for different gestures. This is why, at least in part, the fist Hold and Extend Hold (similar to Fist-Hold but going to full-finger extension instead of fist) plots of FIG. 15A and FIG. 15E, respectively, do not include the same relaxed DC level. Thus different gestures may be recognizable, at least in part, by their specific relaxed DC level.

Figure 3B:
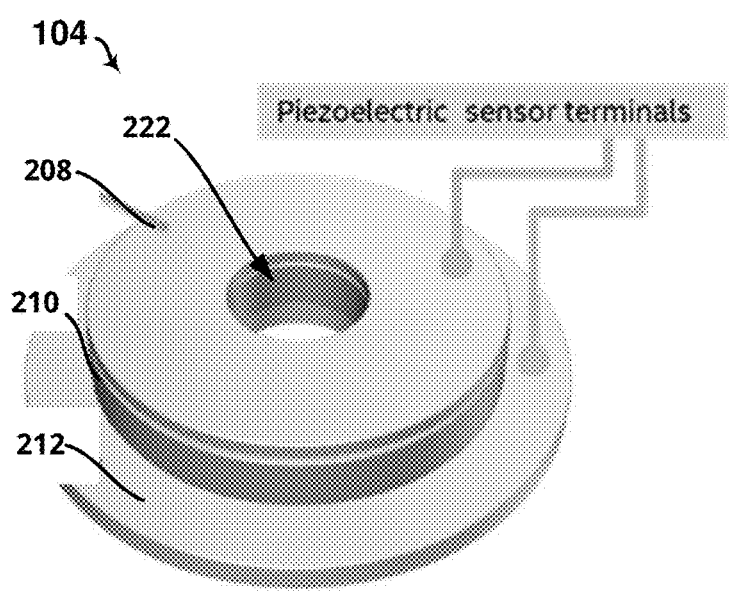
FIG. 3B shows a perspective view of a PZE sensor for use in the hybrid sensor device of FIG. 2A, in accordance with an embodiment of the present disclosure.

In an embodiment, the wearable gesture recognition device 100A optionally includes a hybrid sensor device 200 which may co-locate the PZE sensor 104 and the PPMG sensor 106 into a single sensor package. The hybrid sensor device 200 allows the controller 102 to perform gesture recognition on a fusion of respective signals. One example of such a hybrid sensor device 200 is illustrated in FIG. 3D and discussed in greater detail below. In some cases, the hybrid sensor device 200 may integrate two or more of each sensor type, and is not necessarily limited to one sensor of each type, such as illustrated in the example embodiment of FIG. 1A.

Example PPMG Wearable Gesture Recognition Device

Figure 1B:
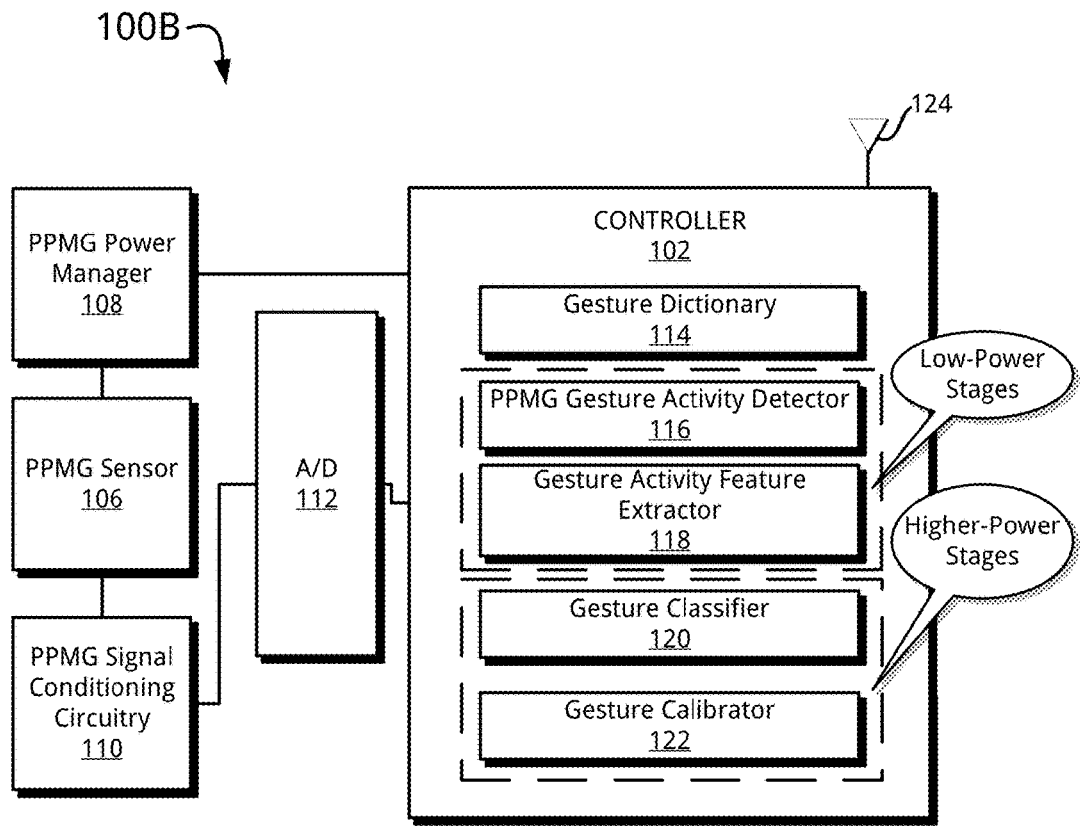
FIG. 1B illustrates another block diagram of the wearable gesture recognition device of FIG. 1A and includes a photoplethysmography (PPMG) sensor arrangement in accordance with an embodiment of the present disclosure.

Now referring to FIG. 1B, a block diagram of a wearable gesture recognition device 100B featuring a PPMG-centric sensor arrangement is shown in accordance with an embodiment of the present disclosure. The wearable gesture recognition device 100B exclusively uses a PPMG sensor for gesture recognition, without a PZE sensor such as the PZE sensor 104. The wearable gesture recognition device 100B may include two or more PPMG sensors, and is not necessarily limited to one PPMG sensor, as illustrated. For the purpose of brevity, descriptions of some components (e.g., PPMG sensor 104 and the PPMG power manager 108) described within the context of FIG. 1A will not be repeated, but are equally applicable to the example embodiment shown in FIG. 1B.

As shown, the controller 102 includes a gesture dictionary 114, a PPMG gesture activity detector 116, a gesture activity feature extractor 118, a gesture classifier 120, and a gesture calibrator 122. The controller 102 may provide these components/stages through, for example, a plurality of machine-readable instructions, but this disclosure is not necessarily limited in this regard. For example, some of the components may comprise hardware, circuitry, software instructions, or any combination thereof. Moreover, one or more of the components/stages may be physically located external to the controller 102.

The gestures dictionary 114 may provide a definition of specific recognizable gestures (e.g., gesture identifiers), and a map that associates each gesture with a corresponding action. For instance, a finger-pinch gesture may map to a click-and-hold command. The gestures dictionary may store reference signals that represent characteristics for each recognizable gesture. For example, each reference signal may provide a number of samples that collectively represent a waveform for the gesture. Moreover, each recognizable gesture may include N number of reference waveforms. In some cases, the reference signals may be referred to as replica signals or gesture replicas. A user may execute a training process in which a user performs each gesture to have a reference signal stored in the gestures dictionary 114 for a given gesture. In some cases, a memory associated with the controller 102 stores the gestures dictionary 114. Some specific examples of gesture reference signals including PZE, PPMG, and the virtual sensor (PZE+PPMG) waveforms are shown in FIGS. 12-14, respectively.

As shown, the controller 102 includes a plurality of low-power stages that provide signal processing capabilities that can detect probable gesture activities within a signal provided by the PPMG sensor 106, and trigger additional gesture recognition processing by higher-power stages. The lower-power stages advantageously may perform activity detection to first determine the presence of probable gesture activity prior to performing gesture classification that consumes device power (e.g., through calculations, memory usage, and so on). Stated differently, the lower-power stages seek to perform a minimum or otherwise reduced number of calculations while using a minimum or otherwise reduced amount of memory to determine the presence of a probable gesture. Some specific example methodologies for each respective stage including both low-power and high-power stages is discussed below with regard to FIGS. 7A-7E.

In any event, the PPMG gesture activity detector 116 may receive a digitized PPMG signal from the PPMG sensor 106, and detect probable gesture activity therein. The PPMG gesture activity detector 116 may use the gesture activity feature extractor 118 to extract the particular features of probable gesture activity. For instance, the gesture activity feature extractor 118 may derive the energy feature (e.g., in Joules) of a given PPMG signal and the particular start and end position (e.g., the offset within the buffer holding the digitized PPMG signal) of the probable activity within the digitized PPMG signal.

In turn, the PPMG gesture activity detector 116 may utilize the extracted features to trigger additional gesture recognition processing on detected probable gesture activity. In some cases, the gesture classifier 120 analyzes the PPMG signal having the probable gesture activity and may correlate the same against reference signals stored in the gesture dictionary 114. The gesture classifier may recognize a particular gesture, and may then cause a corresponding command to be executed. For instance, a finger-pinch gesture may be recognized based on a PPMG waveform that suggests a user's index finger is in contact with the user's thumb. The controller 102 may then execute a corresponding command for the particular gesture, such as a mouse-click or other navigation command, for example. A computing device that includes the wearable gesture recognition device 100B may execute the command within a so-called "app," or the controller 102 may send the command to an external computing system via the wireless transceiver 124. For example, a PowerPoint® application executed on an external computing system may receive the mouse-click command and, as a result, advance to a next slide.

The gesture calibrator 122 may provide a user with a process by which to train or otherwise improve gesture recognition accuracy. For example, the gesture calibrator 122 may present a user interface, or other indicator such as an auditory prompt ("Please clench your fingers into a fist"), that requests the user perform a particular gesture. In some cases, the request to perform a particular gesture may accompany a tutorial that visually/aurally represents the particular gesture in a series of steps. Then, the gesture calibrator 122 may detect performance of the particular gesture and store a measured reference signal for the gesture in the gesture dictionary 114. The gesture calibrator 122 may request a user perform the same gesture a number of times to ensure a suitable number of reference signals get stored in the gesture dictionary 114. This training process may also include determining a so-called "fit-level" such that a reference signal is associated with the particular fit-level it was trained at.

The wireless transceiver 124 may include one or more radios capable of transmitting and receiving signals using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the wireless transceiver 124 may operate in accordance with one or more applicable standards in any version. To this end, the wireless transceiver circuit 124 may include, for instance, hardware, circuits, software, or any combination thereof that allows communication with external computer systems.

In some specific non-limiting examples, the wireless transceiver circuit 124 comports with the IEEE 802.11 standard (e.g., Wifi), a Bluetooth, ZigBee, near-field communication, or any other suitable wireless communication standard. In addition, the wireless transceiver circuit 124 may comport with cellular standards such as 3G (e.g., EV-DO, W-CDMA) and 4G wireless standards (e.g., HSPA+, WIMAX, LTE).

In some cases, the wireless transceiver circuit 124 includes the capability of communicating within the 700 Mhz/800 Mhz spectrums which are generally used in public safety applications. In these cases, the wireless transceiver circuit 124 may provide vital information pertaining to a user wearing a wearable gesture recognition device. For example, the PPMG sensor 106 can perform measurements such as pulse, breathing and general movement to determine human activity or a lack thereof, as the case may be. The controller 102 may communicate these measurements to an external computer system which can provide feedback to determine if, for example, a first-responder (e.g., police, fire, or emergency medical services (EMS) professional) is no longer moving, breathing, and so on. The aforementioned examples are not necessarily limited to a particular communication spectrum and may be implemented via numerous other wireless communication standards, such as those discussed above. Thus it should be appreciated that embodiments disclosed herein may extend beyond gesture recognition for controlling a computer system/software application and are applicable in a wide variety of applications.

Continuing with FIG. 1B, the PPMG sensor may electrically couple to PPMG signal conditioning circuitry 110. The PPMG signal conditioning circuitry 110 may include hardware, circuits, software, or any combination thereof that can perform signal filtering and other conditioning routines. In one particular example, the PPMG signal conditioning circuitry 110 may remove low-frequency contents of the PPMG signal that may contain vital information. However, as discussed above, the vital information may be important or otherwise useful in certain applications. To this end, the PPMG signal conditioning circuitry 110 may switchably provide the vital information within an output signal. The PPMG signal conditioning circuitry 110 may condition the PPMG signal to a level of amplitude and frequency bands that are appropriate for signal digitizing by the A/D 112, and subsequent processing for gesture recognition purposes. In some cases, the PPMG signal conditioning circuitry may remove or otherwise mitigate noise including system noise or potential interference from other sources (e.g. digital signals carrying frequency components in the bands of the photodetected signal).

The output of the PPMG signal conditioning circuitry 110 is electrically coupled to an analog to digital (A/D) converter 112 that receives an analog signal and digitizes the same. The output of the A/D converter 112 is electrically coupled an input of the controller 102, and configured to provide the digital representation of the PPMG signal to the controller 102.

Example PPMG/PZE Wearable Gesture Recognition Device

Figure 1C:
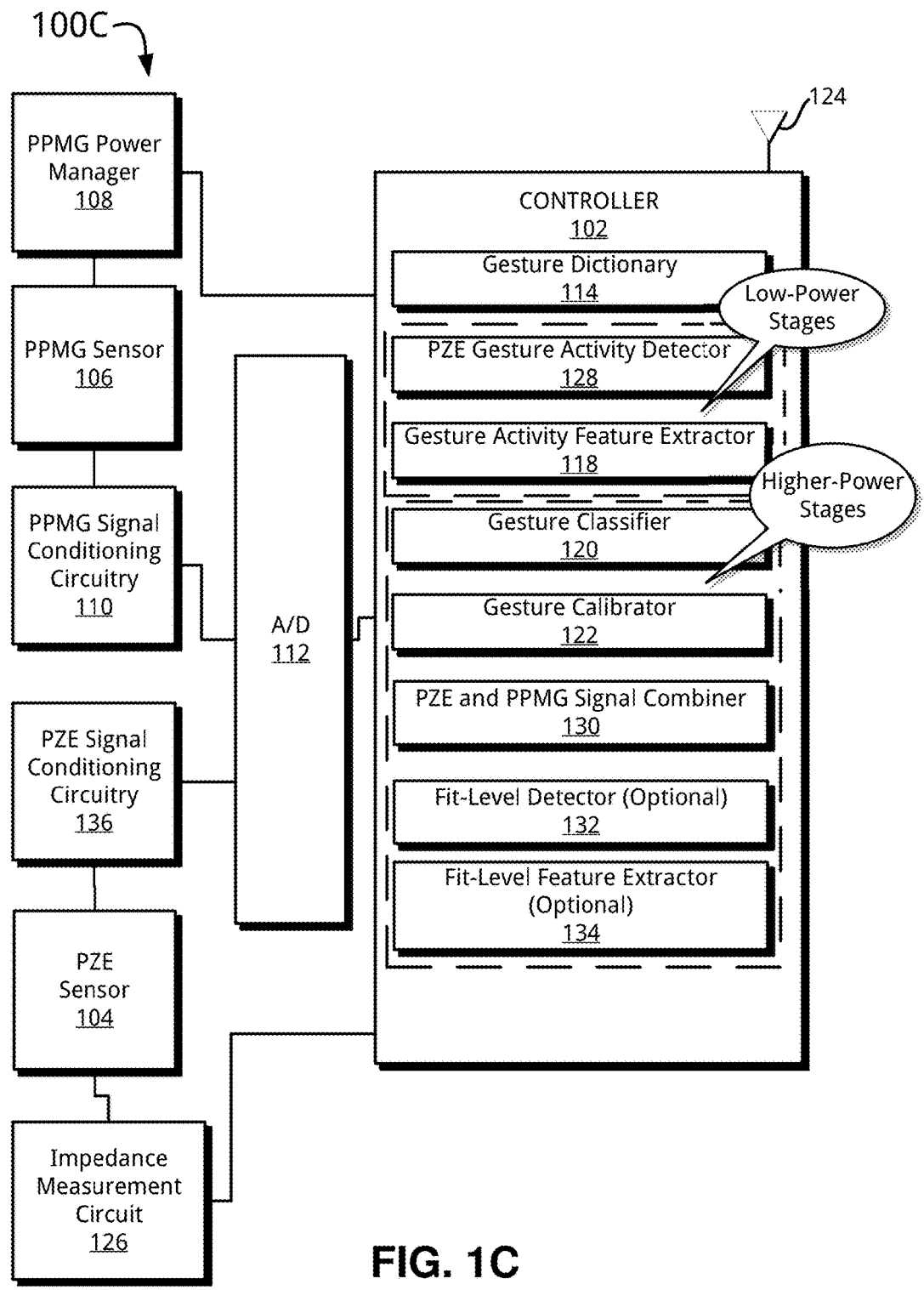
FIG. 1C illustrates another block diagram of the wearable gesture recognition device of FIG. 1A and includes a PPMG sensor and piezoelectric (PZE) sensor arrangement, in accordance with an embodiment of the present disclosure.

Now referring to FIG. 1C a block diagram of a wearable gesture recognition device 100C featuring both a PPMG and a PZE sensor arrangement is shown, in accordance with an embodiment of the present disclosure. The wearable gesture recognition device 100C may be constructed in a similar way to that of the wearable gesture recognition device 100B of FIG. 1B, and to this end, descriptions of common elements will not be repeated but are equally applicable.

As shown in FIG. 1C, the PZE sensor 104 electrically couples an output to the PZE signal conditioning circuitry 136. The PZE signal conditioning circuitry 136 may include hardware, circuits, software, or any combination thereof that can perform signal filtering and other conditioning routines. In one particular example, the PZE signal conditioning circuitry 136 may remove noise or unwanted hand movements from an output signal.

An output of the PZE sensor 104 may also electrically couple to an input of an impedance measurement circuit 126. The impedance measurement circuit 126 allows the controller 102 to relate the DC level in a PPMG signal to the electrical impedance of a PZE signal. This may be particularly advantageous during fit-level calibration routines as discussed below, which may be periodically executed to ensure the wearable gesture recognition device 100C is appropriately positioned and tightened onto a user's wrist or other body locations/appendages. Moreover, and in accordance with an embodiment, the impedance measurement circuit 126 may allow the controller 102 to "switch" to a set of reference signals based on a current fit-level to ensure gesture recognition performance.

In any event, the controller 102 may receive digitized signals via the A/D converter 112 that represent the PPMG signal and PZE signal, respectively. As previously discussed, the controller 102 seeks to perform a minimal number of calculations to determine probable gesture activity and may use low-power stages to do so. To this end, the controller 102 may use the PZE gesture activity detector 128 similar to the PPMG activity detector 116 discussed above. In some cases, the PZE gesture activity detector and the PPMG activity detector 116 are configured identically. However, given the potential differences in signal content, the PZE gesture activity detector 128 may employ various methods of determining probable gesture activity. In one particular example not intended to be limiting, the PZE activity detector 128 may analyze N number of bytes from the PZE signal, and may look for signal transitions within those bytes that characterize movement/vibration. For example, the PZE gesture activity detector 128 may analyze consecutive 4 byte blocks looking for relatively strong signal transitions followed or proceeded by weaker ones. This is because gesture vibrations detected with a PZE sensor correspond to a series of impulses of opposite polarity. During gestures, these vibrations represent the strongest or otherwise most prominent area of a PZE signal.

Alternatively, or in addition to using the PZE gesture activity detector 128, the wearable gesture recognition device 100C may use the PPMG signal in combination with the PZE signal during probable signal detection, which is generally referred to herein as a virtual sensor signal. The PZE gesture activity detector 128 may use the gesture activity feature extractor 118 to extract the particular features from the virtual sensor signal, as previously discussed above with regard to FIG. 1B.

After the controller 102 determines probable gesture activity within the PZE signal, the controller 102 may use the PZE and PPMG signal combiner 130 to normalize and combine respective portions of the PZE and PPMG signals into a virtual sensor signal. The virtual sensor signal may provide a digital signal which includes a waveform with both a PZE and a PPMG component. For example, the PZE and PPMG signal combiner 130 may perform computations on both the PZE signal and the PPMG signal, or on portions thereof, to normalize the signals and simply concatenate the two into a common signal. FIG. 14 depicts a plurality of example concatenated (aggregated) virtual sensor waveforms. Other suitable methods of combining PZE and PPMG signals will be apparent in light of this disclosure.

The gesture classifier 120 may then analyze the virtual sensor signal and may correlate the same against reference signals stored in the gesture dictionary 114. The gesture classifier may recognize a particular gesture within the virtual sensor signal, and may then cause a corresponding command to be executed. In some cases, the reference signals used during classification may be selected based on a current fit-level. For example, the controller 102 may determine a fit-level change, and accordingly, select a fit-level from a plurality of fit-levels known to the controller 102 that match or approximate the presently determined fit-level, as discussed below.

As previously discussed, gesture recognition using PZE signals may be adversely impacted by wrist-band fit level, which is generally a function of the degree of contact and force in which the PZE sensor 104 is attached to skin. The impendence measurement circuit 126 allows the controller 102 to, in a sense, to detect a change in fit level and adjust to a particular set of reference signals in the gesture dictionary 114 that are optimized for the particular fit level. Thus the gesture classifier 120 may automatically use reference signals that were "learned" or otherwise pre-stored at the detected fit level. In some cases, the controller 102 uses the detected change in fit-level to suggest to a user that the wearable gesture recognition device 100C requires tightening, or loosening, as the case may be. In any such cases, the fit-level detection may occur periodically (e.g., every 1, 2, 5, 10, 30 seconds) to determine if fit-levels have changed.

FIGS. 9A-9B show example plots that illustrates the effect of fit-level and the DC-level shift that results in a PPMG signal. As shown in the example plot of FIG. 9A, a user adjusted a wrist-band having the PPMG sensor from a baseline fit-level to increasingly tighter fit levels over time. In this instance, the change of fit-level caused a DC-level shift to occur each time the PPMG sensor was more tightly applied to the user's skin. In the example plot of FIG. 9B, the DC level returned to generally the baseline DC level after the user loosened the wrist band, and more particularly, reduced the pressure of the PPMG sensor against the user's skin. As should be appreciated, the higher measured voltage correlates to higher detection of reflected light.

Figure 10A:
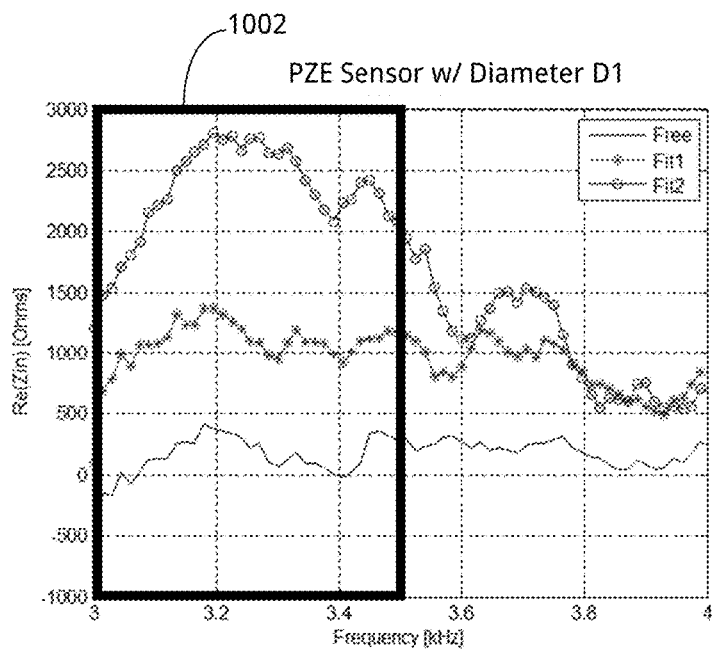
FIGS. 10A-10D show example plots that illustrate impedance of a PZE signal based on varying sensor diameter, in accordance with an embodiment of the present disclosure.
Figure 10B:
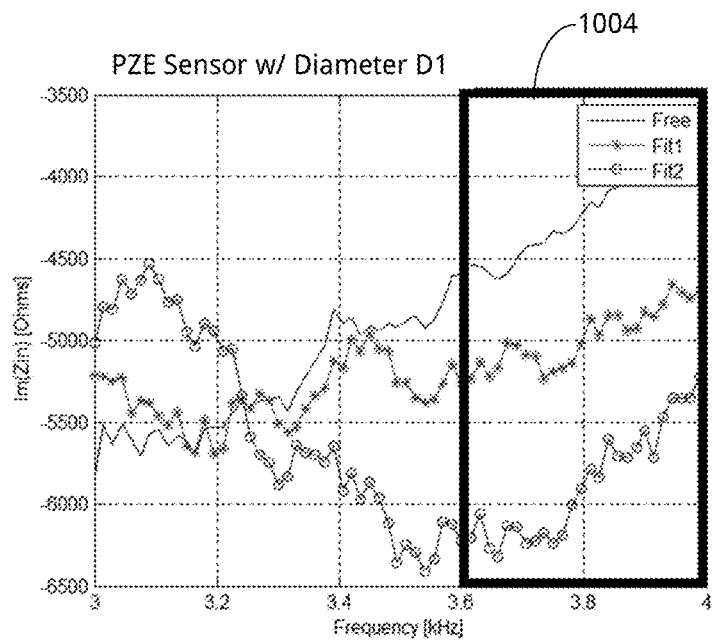
Figure 10C:
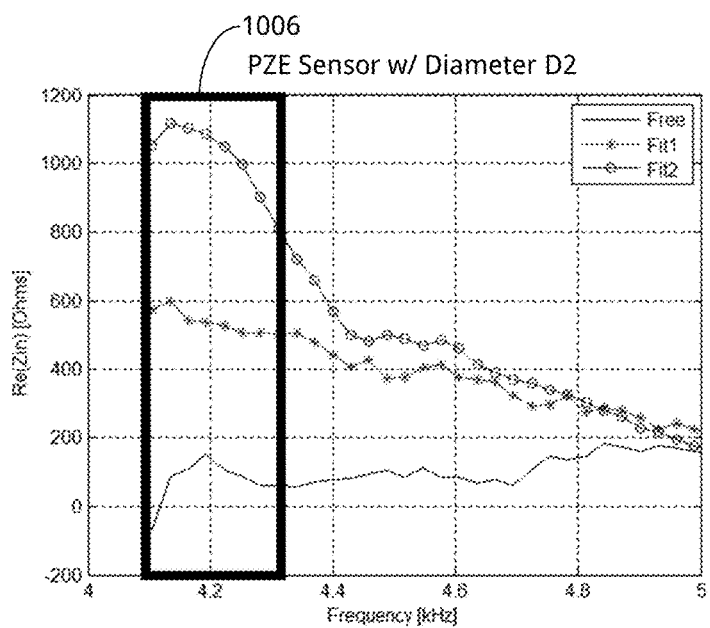
Figure 10D:
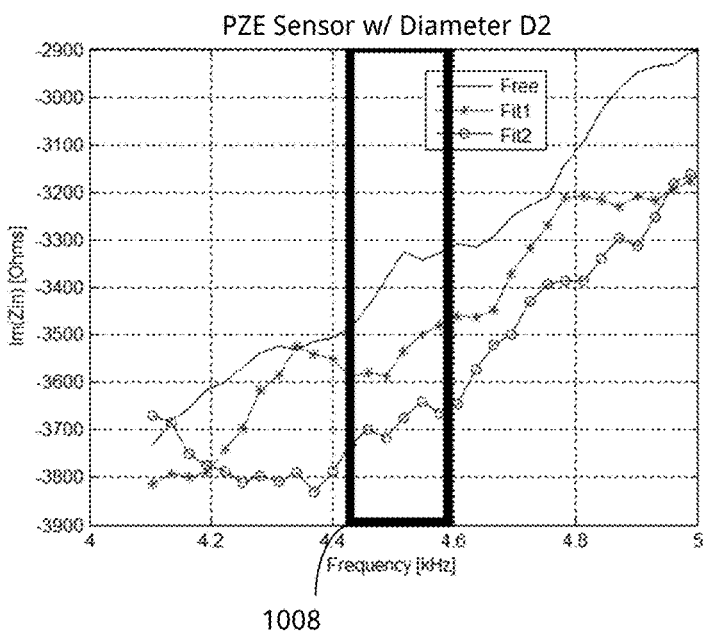

On the other hand, impedance may be utilized to determine fit-level. FIGS. 10A-10D show example plots corresponding to a PZE sensor having two different sensor diameters, D1 and D2, respectively. As shown in FIGS. 10A-10B, the impedance of the PZE may be represented as a complex number, and thus the example plots illustrate measured impedance in real and imaginary parts based on PZE sensor diameter D1. FIGS. 10B-10C show similar plots, but based on a PZE sensor with a different diameter, D2. Within each plot, the following three conditions were measured: free (wrist-band not worn), Fit1 (low contact force) and Fit2 (larger contact force).

As should be appreciated, both PZE diameters D1 and D2 demonstrate significant differences in certain frequency ranges with different fit-levels. In particular, those frequencies ranges shown generally at 1002-1008. Thus, and in accordance with an embodiment, PZE impedance variations may be used to estimate fit-level. However, the specific method (e.g., using real or imaginary part measurement), the specific frequencies and the specific circuitry used may vary depending on the characteristics of the PZE sensor used. Therefore, there are numerous options to determine fit-level from PZE impedance measurements and this disclosure is not limited in this regard. One specific example of a method configured to measure impedance at the frequencies where the impedance variations are expected to be larger for real and imaginary parts is shown in FIG. 8B.

Example Hybrid Sensor Device Including Fusion of PZE and PPMG Sensors

Figure 2A:
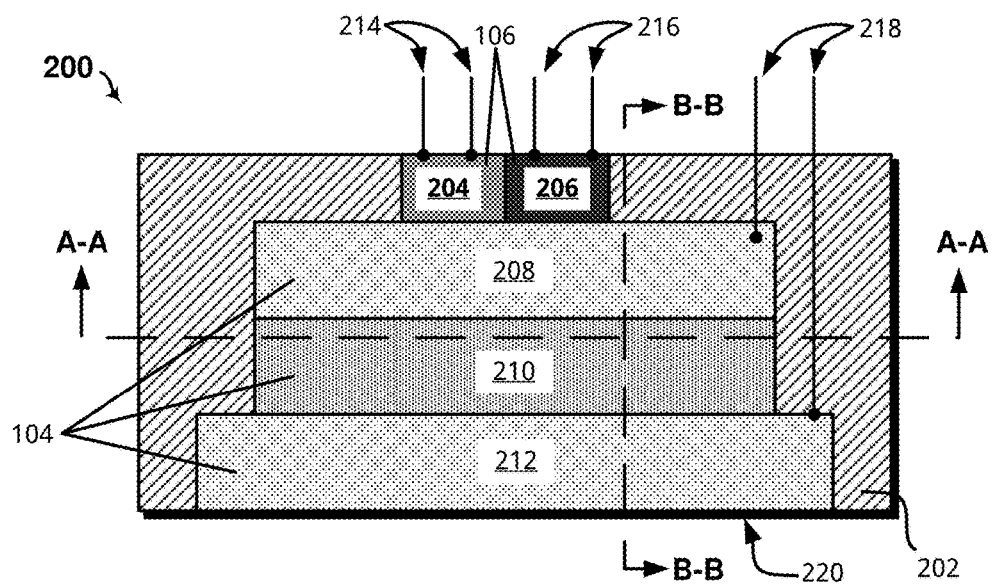
FIG. 2A shows an example hybrid sensor device including an integrated PPMG sensor and PZE sensor, in accordance with an embodiment of the present disclosure.

Now referring to FIG. 2A, a schematic diagram of one example hybrid sensor 200 is illustrated in accordance with an embodiment of the present disclosure. As shown, the hybrid sensor 200 includes a substrate 202, an IR LED 204, an IR sensor 206 or photodetector, a top electrode 208 or conductor, a PZE slab 210 or PZE material, a bottom electrode 212 or conductor, LED terminals 214, IR sensor terminals 216, and PZE sensor terminals 218.

The substrate 202 may comprise, for example, a non-conductive material such as glass, plastic, polycarbonate. In some cases, the non-conductive material includes acrylonitrile-butadine-styrene (ABS) or any of the polymeric encapsulant materials used for micro-electronic circuit packaging like epoxies, silicones, acrylics, polyimides, cyanate esters and amorphous polymers. The substrate may provide structural support for the sensor and a protective housing. The substrate 202 provides support for the PZE sensor 104 such that the bottom electrode 212 is in direct contact with the skin. To this end, the substrate 202 can include an opening at the base 220 allowing a bottom surface of the bottom electrode 212 to make contact with a user's skin.

The top and bottom electrodes 208 and 212, respectively, may comprise electrically conductive material such as, for example, copper, or other suitable metals. In some cases, the top and bottom electrodes 208 and 212 comprise a metal such as brass or gold that resists corrosion and is not particularly irritating to the user's skin. Alternatively, bottom electrode 212 may include a protective coating that resists corrosion and avoids allergic or otherwise unpleasant reaction with skin. This through-hole may be accurately described as a PPMG sensor receptacle.

Figure 2B:
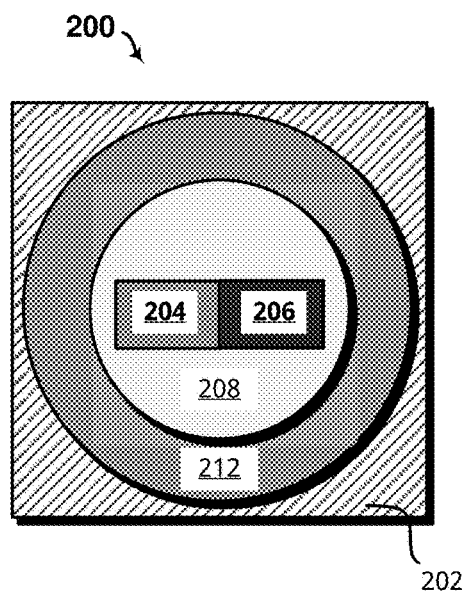
FIG. 2B is a cross-sectional view of the hybrid sensor device of FIG. 2A taken along the line A-A, in accordance with an embodiment of the present disclosure.

Now referring to FIG. 2B, a cross-sectional view of the hybrid sensor device 200 is shown taken along the line A-A of FIG. 2A. As shown, the top electrode and bottom electrode of the PZE sensor 104 include a generally circular or rounded shape and are also generally concentric.

Figure 2C:
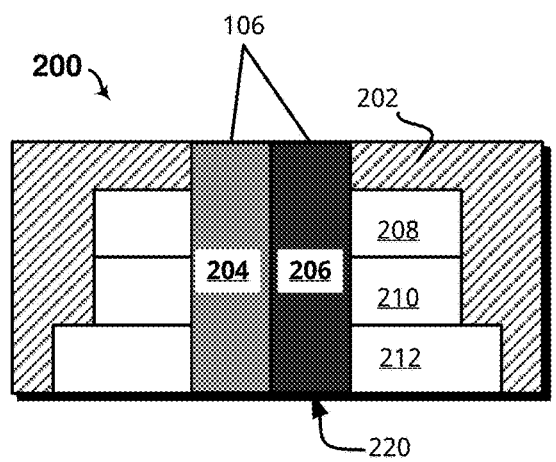
FIG. 2C is another cross-sectional view of the hybrid sensor device of FIG. 2A taken along the line B-B.

Referring now to FIG. 2C, a cross-sectional view of the hybrid sensor device 200 taken along the line B-B of FIG. 2B is shown. As shown, the IR LED 204 and the IR sensor 206, extend from a top of the hybrid sensor device 200 to the base 220. A through-hole formed in the top electrode 208, PZE slab 210 and the bottom electrode 212 is configured to receive the IR LED 204 and the IR sensor 206, and to allow the same to make direct contact or otherwise be in close proximity to a user's skin.

FIG. 3A illustrates one specific example PPMG sensor 106 that includes the IR LED 204 and the IR detector 206. In FIG. 3B, one example of a PZE sensor 104 includes a through-hole 222 or PPMG receptacle configured to receive at least a portion of the PPMG sensor 106.

Figure 3C:
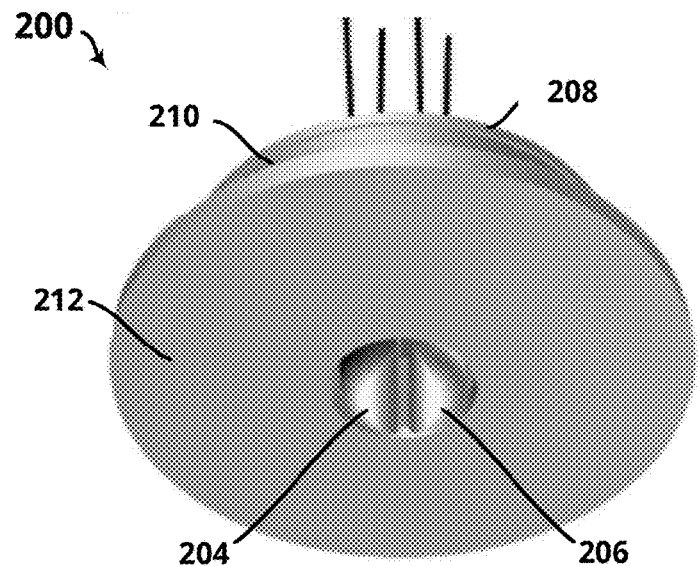
FIG. 3C shows a perspective view of the hybrid sensor device of FIG. 2A, in accordance with an embodiment of the present disclosure.
Figure 3D:
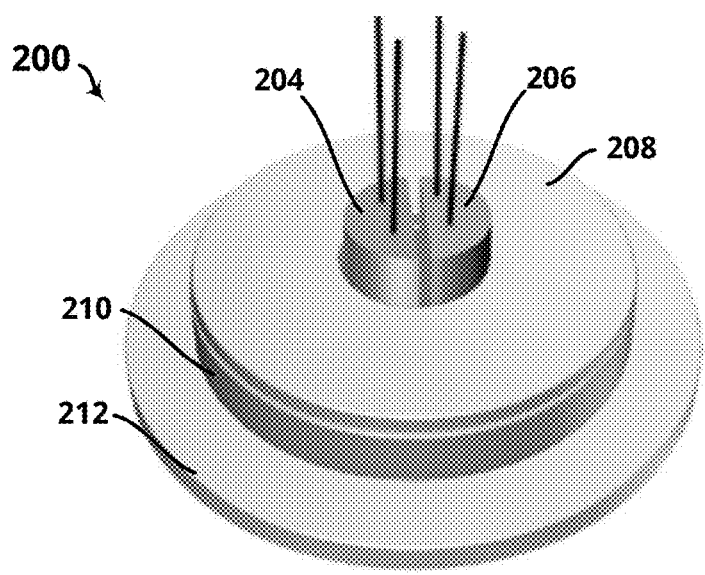
FIG. 3D shows another perspective view of the hybrid sensor device of FIG. 2A, in accordance with an embodiment of the present disclosure.

FIGS. 3C and 3D illustrate one example of a hybrid sensor 200 after insertion of the PPMG sensor 106 into the through-hole 222 of the PZE sensor 104. Note that the substrate 202 is omitted merely for clarity.

Figure 4:
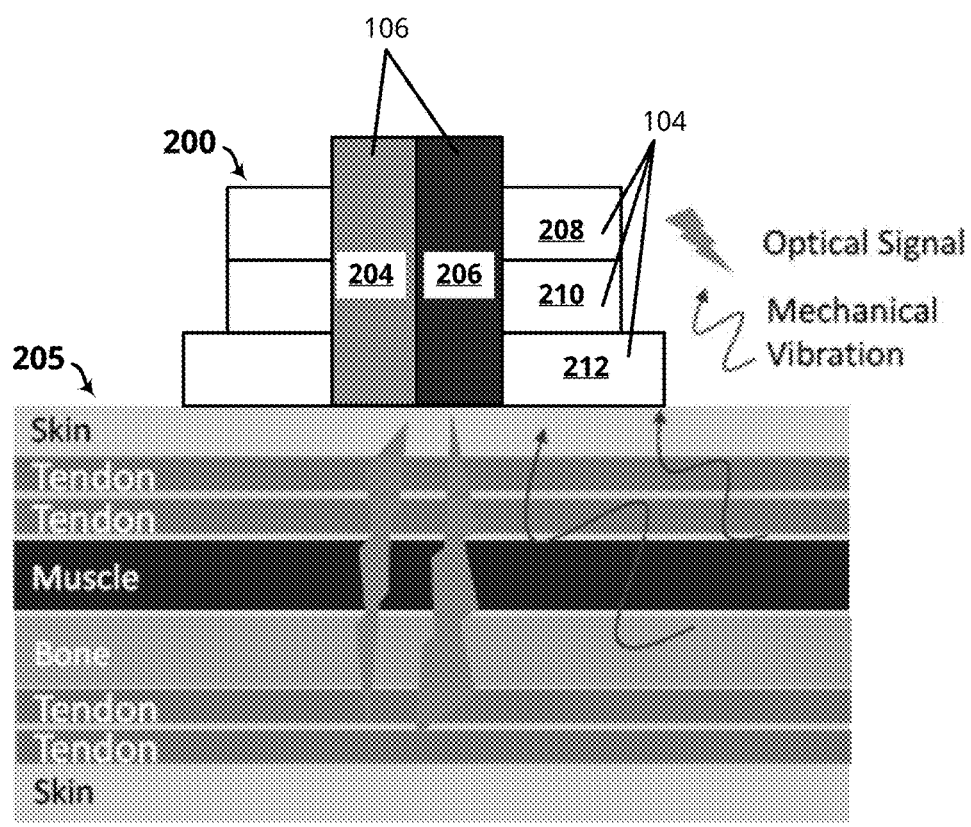
FIG. 4 illustrates a cross-sectional view of the hybrid sensor device taken along the line B-B of FIG. 2A disposed adjacent the skin, tendons, and associated tissue of a human wrist, in accordance with an embodiment of the present disclosure.

Now referring to FIG. 4, the cross-sectional view of the hybrid sensor device 200 taken along the line B-B of FIG. 2A is shown positioned adjacent to human wrist tissue 205. As shown, tendons populate a large portion of the tissue 205. Hand and finger movement is a function of the tendons moving or otherwise being displaced. The movement/displacement of tendons within the wrist tissue 205 can result in variations in both optical reflections measured by the PPMG sensor 106 and mechanical vibration measured by the PZE sensor 104.

Figure 5:
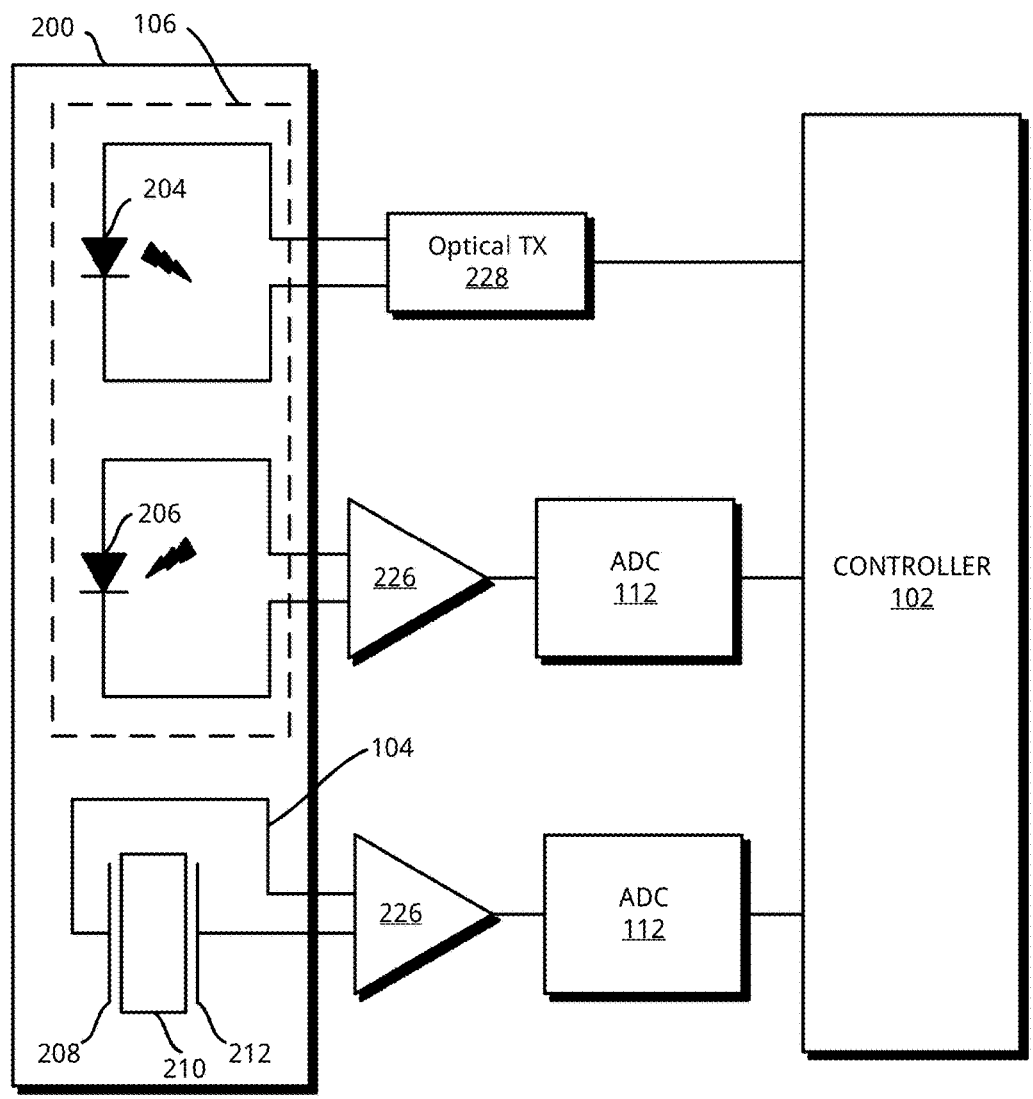
FIG. 5 shows an example schematic diagram for the hybrid sensor device of FIG. 2A, in accordance with an embodiment of the present disclosure.

FIG. 5 shows on example schematic diagram for the hybrid sensor device 200 in accordance with an embodiment of the present disclosure. As should be appreciated, the hybrid sensor device 200 is illustrated in a highly simplified form and may include additional components. As shown, the PPMG sensor 106 is communicatively coupled to an optical transmitter 228. The optical transmitter 228 may comprise hardware, circuits, software, or any combination thereof, that allows the IR LED 204 to switchably emit light for measurement purposes. In some cases, the optical transmitter 228 includes a resistor tied to a DC voltage supply (not shown). In other cases, the optical transmitter 228 includes some type of signal modulation (e.g. frequency modulation) or codification to improve or otherwise increase the interaction of the signals with the adjacent tissue. In this case, there also may be a receiver circuit (RX) block (not shown) between the op amp 226 and the ADC 112 configured to demodulate or decode the received signal.

In some cases, the optical TX 228 includes an associated duty cycle that is governed by the PPMG power manager 108. On the other hand, the IR sensor 206 is configured to receive light emitted by the IR LED 204 and provide an electrical signal proportional to the same to operational amplifier (op amp) 226. The op amp 226 may then provide an amplified signal to ADC 112. In turn, ADC 112 can provide a digitized PPMG signal to the controller 102. It should be appreciated that additional stages may provide filtering and other conditioning of the PPMG signal, as previously discussed.

Continuing with FIG. 5, the hybrid sensor device 200 further includes the PZE sensor 104 coupled to another op amp 226. The PZE sensor 104 may provide an electrical signal proportional to the measured mechanical vibration to op amp 226. In turn, op amp 226 may provide an amplified signal to ADC 112, which digitizes and provides the same to the controller 102.

Figure 6:
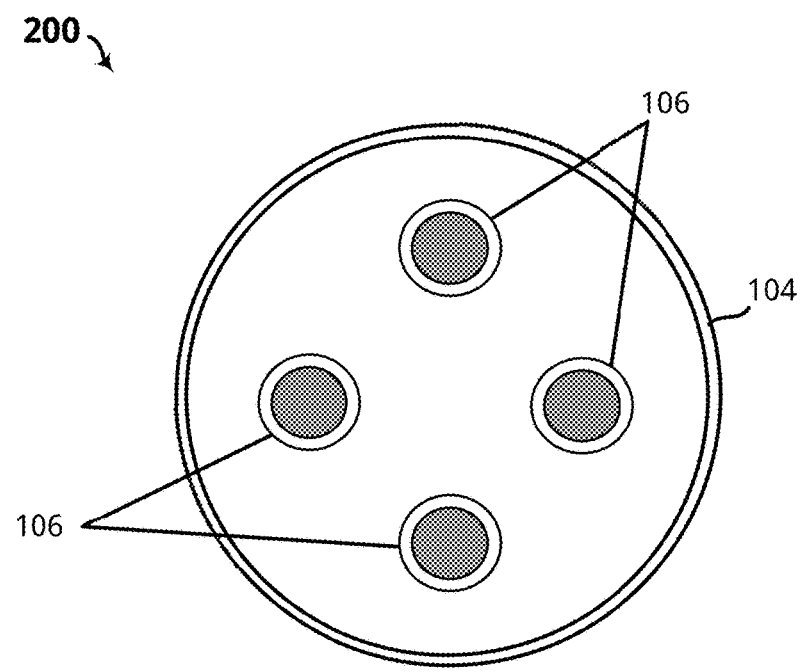
FIG. 6 shows a perspective view of one example embodiment of the hybrid sensor device of FIG. 2A configured for small form-factor (SFF) applications, in accordance with embodiments of the present disclosure.

FIG. 6 illustrates an additional embodiment of the hybrid sensor 200 including a PZE sensor 104 having through-holes to provide a plurality of PPMG sensors 106. In this case, the hybrid sensor 200 may comprise a disc-shape or other suitable shape for inclusion in low-profile or otherwise small form-factor (SFF) applications. One such SFF application includes a smart watch with the hybrid sensor 200 positioned behind the face of the watch and configured to make contact with a user's skin. As should be appreciated, the example embodiment of the hybrid sensor 200 of FIGS. 2A-3D may also be utilized in numerous SFF applications such as smart watches, wrist-bands and other wearable devices.

Example Methodologies

As previously discussed, the controller 102 can use a number of stages to perform gesture activity detection and subsequent gesture recognition processes. These stages may be categorized as low-power or higher-power stages relative to the number of calculations, and associated complexity, and memory usage. For the purposes of conserving device power, a device implementing the wearable gesture recognition devices 100A-C disclosed herein may process signal data through low-power stages to detect probable gesture activity to avoid the expense associated with higher-power gesture classification.

FIG. 7A illustrates one such example method 700 for gesture recognition using a plurality of low-power stages and higher-power stages. The example method 700 may be carried out by the controller 102 in combination with hardware, or software, or both, although other embodiments will be apparent in light of this disclosure. Method 700 begins in act 702.

In act 703, the controller 102 may periodically determine a current fit-level and adjust reference signals based on that determined fit-level. As previously discussed, the degree of contact a PZE sensor has against a user's skin can affect the PZE signal output by that sensor. To this end, the gesture dictionary 114 may store one or more reference signals for each recognizable gesture and associate the reference signals with the particular fit-level those reference signals were optimized or otherwise trained using. As a result of the periodic execution of act 703, the controller 103 may "switch" to a different fit-level, and thus, use a different set of the one or more references signals for each gesture, based on the detected fit-level to ensure gesture recognition performance.

In act 704, the controller 102 receives one or more digitized signals. In an embodiment, the one or more digitized signals include a digitized PZE signal, or a digitized PPMG signal, or both.

In act 706, the controller 102 performs gesture detection on the one or more digitized signals. In the event the one or more digitized signal includes a digitized PPMG signal, without a digital PZE signal, the controller 102 may use the PPMG gesture activity detector 116 and the gesture activity feature extractor 118 to detect and extract probable gesture features. On the other hand, if the one or more digitized signals include both digitized PPMG signals and PZE signals, the controller 102 may use the PZE gesture activity detector 128 and the gesture activity feature extractor 118 to detect and extract probable gesture features, for example.

In some cases the PZE gesture activity detector 128 and PPMG gesture activity detector 116 may comprise the same stage or may be otherwise substantially similar in construction and function. For example, the stages may seek to identify the energy feature or average power of a signal, with those calculations being signal-agnostic and applicable to either type of signal for the purpose of detecting probable gesture activity.

In any event, the method 700 continues to act 708 and determines if a valid probable gesture was detected. This determination may be based on an activity flag (1=probable gesture activity detected) set by the particular stage used by the controller during performance of act 706. In the event probable gesture activity was detected, the method 700 continues to act 710, otherwise the method 700 returns to act 704 and continues execution of acts 704-708 until a valid probable gesture gets detected.

In act 710, the controller 102 performs gesture recognition on at least a portion of the one or more digitized sensor signals. The controller 102 may retrieve reference signals from the gesture dictionary 114 to perform correlations, or other suitable identification processes. While the following methods and example refer to a simple correlation method of gesture recognition, other suitable approaches are also within the scope of this disclosure. For example, the controller 102 may use neural network methods or methods based on eigen-decomposition of signals, just to name a few.

In some cases, the gesture dictionary 114 stores at least one reference signal for each recognizable gesture. In other cases, the gesture dictionary 114 stores at least one reference signal for each recognizable gesture for each fit-level. In any such cases, the controller 102 may perform gesture recognition by comparing at least a portion of the digitized signals to one or more reference signals retrieved from the gesture dictionary 114. The recognition may be based, in part, on the computed correlation between a particular digitized signal and a reference signal from the gesture dictionary 114 exceeding a predetermined threshold.

In act 712, if the controller 102 recognizes a particular gesture the method 700 continues to act 714. Otherwise, the method 700 returns to act 704 and continues to perform acts 704-712.

In act 714, the controller 102 executes, or causes to execute, the command associated with the gesture recognized in act 710. In some cases this includes communicating wirelessly via wireless transceiver 124 with an external computing system to control an application or other processes executed thereon. For instance, the external computing system may execute a mouse-click command based on a gesture recognized in act 714. It should be appreciated in light of this disclosure that the commands associated with recognized gestures can include, but are not limited to, navigation gestures (e.g., mouse clicks, mouse movement, advancing to a next slide in a presentation), click-and-hold (e.g., during drag-and-drop operations), and any other command that may executed by a computer to affect the operation of a particular computer program/process. In some cases, the gestures operate as a virtual mouse, virtual keyboard, or other such devices, allowing complete control of a computer system thereby.

As discussed above, the controller 102 may perform gesture recognition using low-power stages to avoid the expense of full gesture classification until probable gesture activity is detected. It should be appreciated that numerous methods of activity detection are within the scope of this disclosure. For example, any suitable method that allows differentiation of noise from possible gestures may be utilized. These methods could range from as simple as a measured signal peak exceeding a predetermined threshold to average signal energy or power. Other examples include using the "zero-crossing rate" which is generally used in voice detection approaches and, in a basic sense, provides the number of zero crossings a signal includes. Still other approaches may include statistical or heuristic analysis.

Figure 7B:
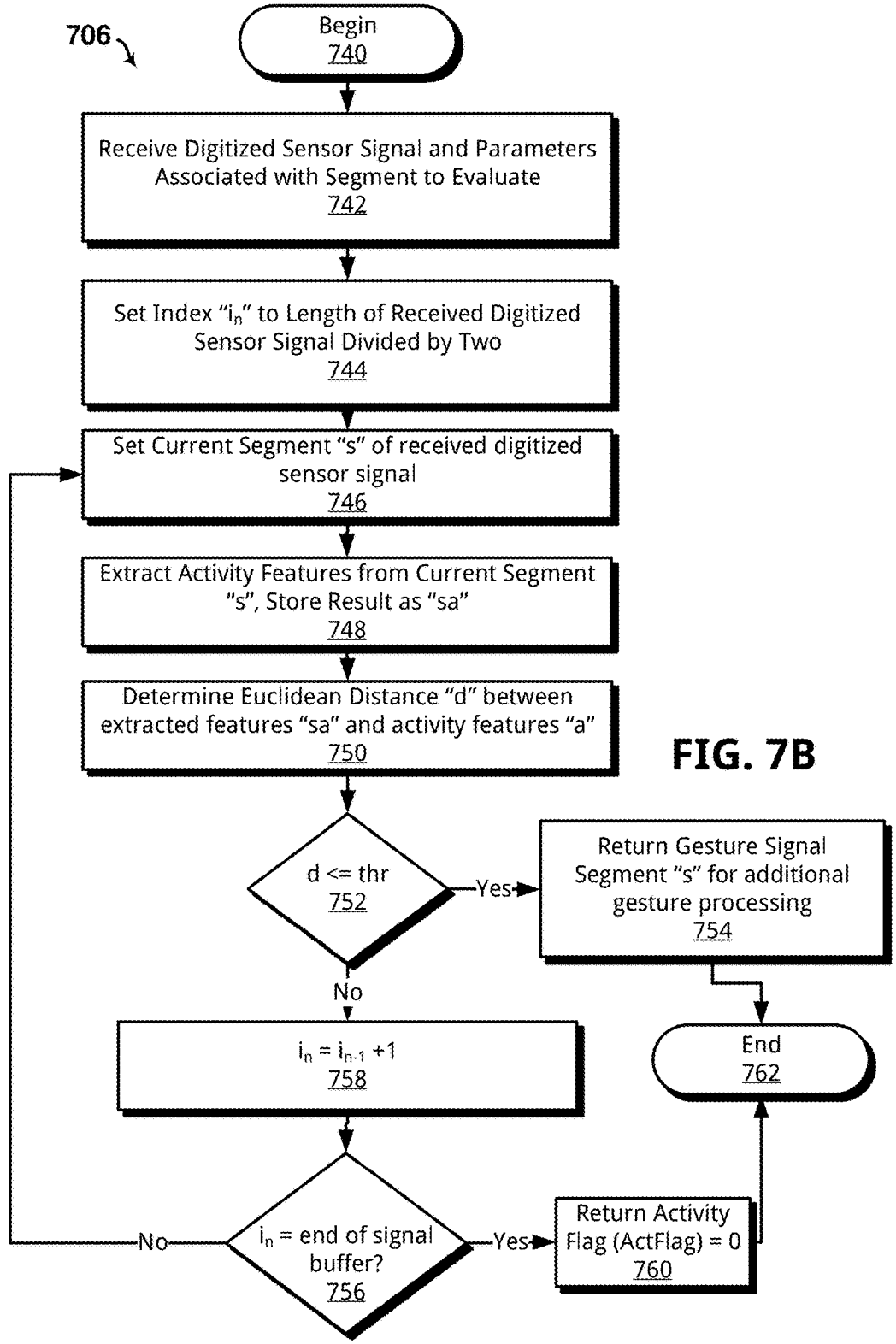
FIG. 7B shows an example method for performing low-power probable gesture activity detection using the wearable gesture recognition device of FIGS. 1A-1C, in accordance with an embodiment of the present disclosure.

One particular example method 706 for detecting probable gesture activity is shown in FIG. 7B. In particular, method 706 seeks to determine that a calculated average energy of a received digital sensor signal exceeds a predefined activity threshold. The method 706 begins in act 740.

In act 742, the controller 102 receives a digitized sensor signal and parameters associated with a particular segment/portion of the signal to analyze. Some such example parameters may include the evaluation segment length (SegLen), a predefined activity threshold (thr), a gesture length (GestLen), an activity feature array (a), and a signal buffer length (BuffLen).

In act 744, the controller 102 sets index "$i_n$" to the length of the received digitized sensor signal divided by two (i=GestLen/2). In some cases this avoids or otherwise reduces the potential of detecting a partial gesture.

In act 746, the controller 102 sets the current segment "s", which is defined by the start of the segment defined by index "$i_n$" and the end of the segment defined by the sum of index "$i_n$" and the SegLen.

In act 748, the controller 102 extracts activity features from the current segment "s" and stores the results as signal activity features "sa". In this particular example method 706, the extraction of activity features may include squaring each byte of the signal buffer, summing each squared byte, and dividing the sum of the squared bytes to calculate the average energy of the waveform represented within the signal buffer. Other feature extraction approaches are within the scope of this disclosure, as discussed above, and the provided example should not be construed as limiting.

In act 750, the controller 102 determines a Euclidean distance "d" between the extracted features "sa" and the activity features "a". Continuing the example, the extracted features "sa" may be the computed average energy for the waveform represented in the signal buffer. The activity features "a" may then include a reference value that represents a minimum average energy known to be associated with valid gesture activity. Thus, the determined distance "d" may then be compared to the predefined activity threshold to determine if the signal buffer includes a waveform having probable gesture activity therein.

In act 752, if the determined distance "d" is less than or equal to the predefined activity threshold "thr", the method 706 continues to act 754. Otherwise, the method 706 continues to act 758.

In act 754, the controller 102 returns or otherwise stores the current gesture signal segment "s" for additional, higher-power, gesture processing and sets an activity flag (ActFlag) to one (ActFlag=1) to indicate probable activity found within the current signal segment "s".

In act 758, the controller 102 increments index "$i_n$" ($i_n$=$i_{n-1}$+1). In act 756, the controller 102 determines if the index "$i_n$" is equal to the end of the signal buffer. If so, the method 706 continues to act 760 and sets an activity flag (ActFlag) to zero (ActFlag=0) to indicate no probable activity found within the current signal segment "s". In act 762 the method 706 ends.

Figure 7C:
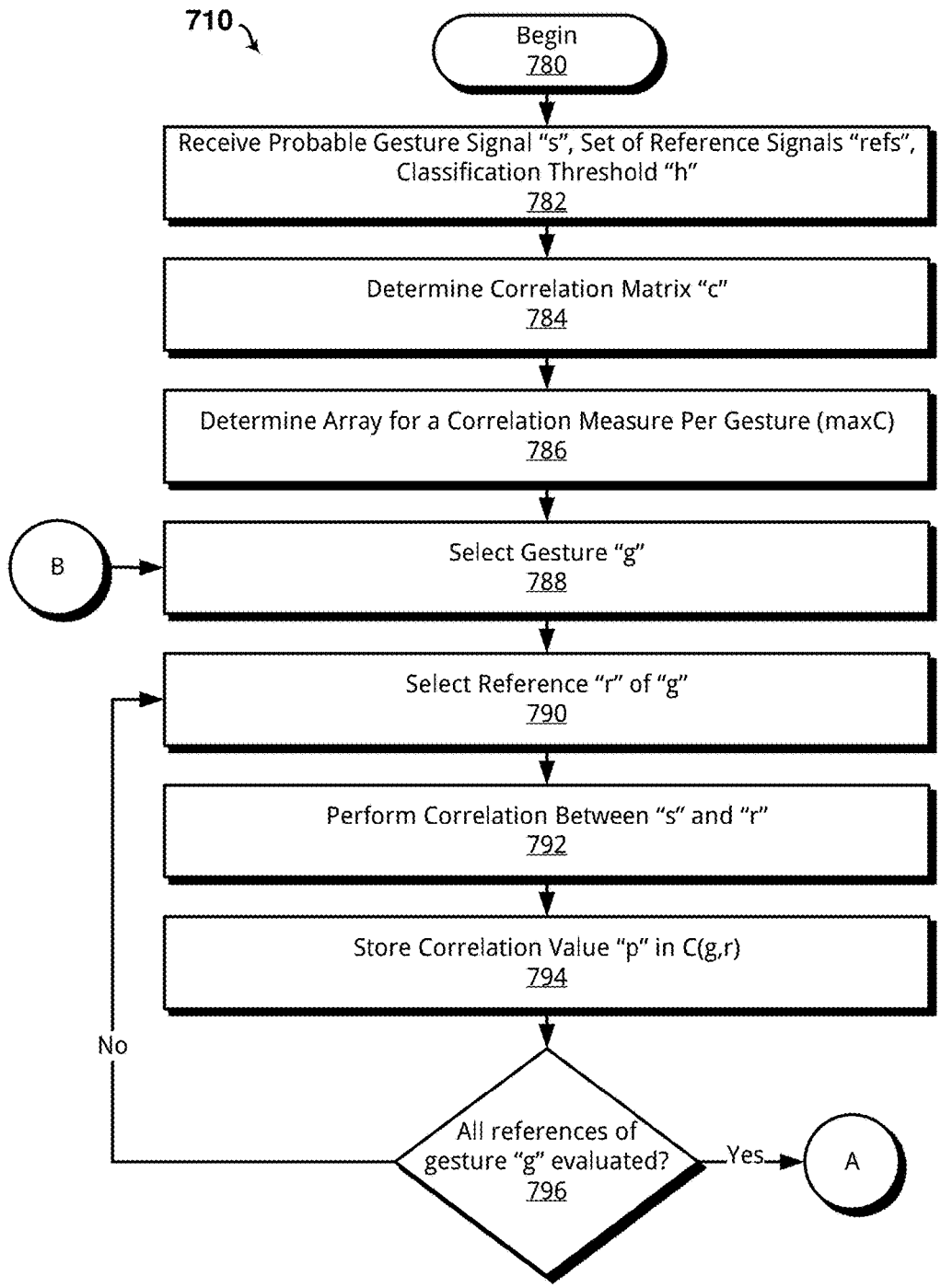
FIGS. 7C-7D collectively show an example method for performing gesture classification using the wearable gesture recognition device of FIGS. 1A-1C, in accordance with an embodiment of the present disclosure.
Figure 7D:
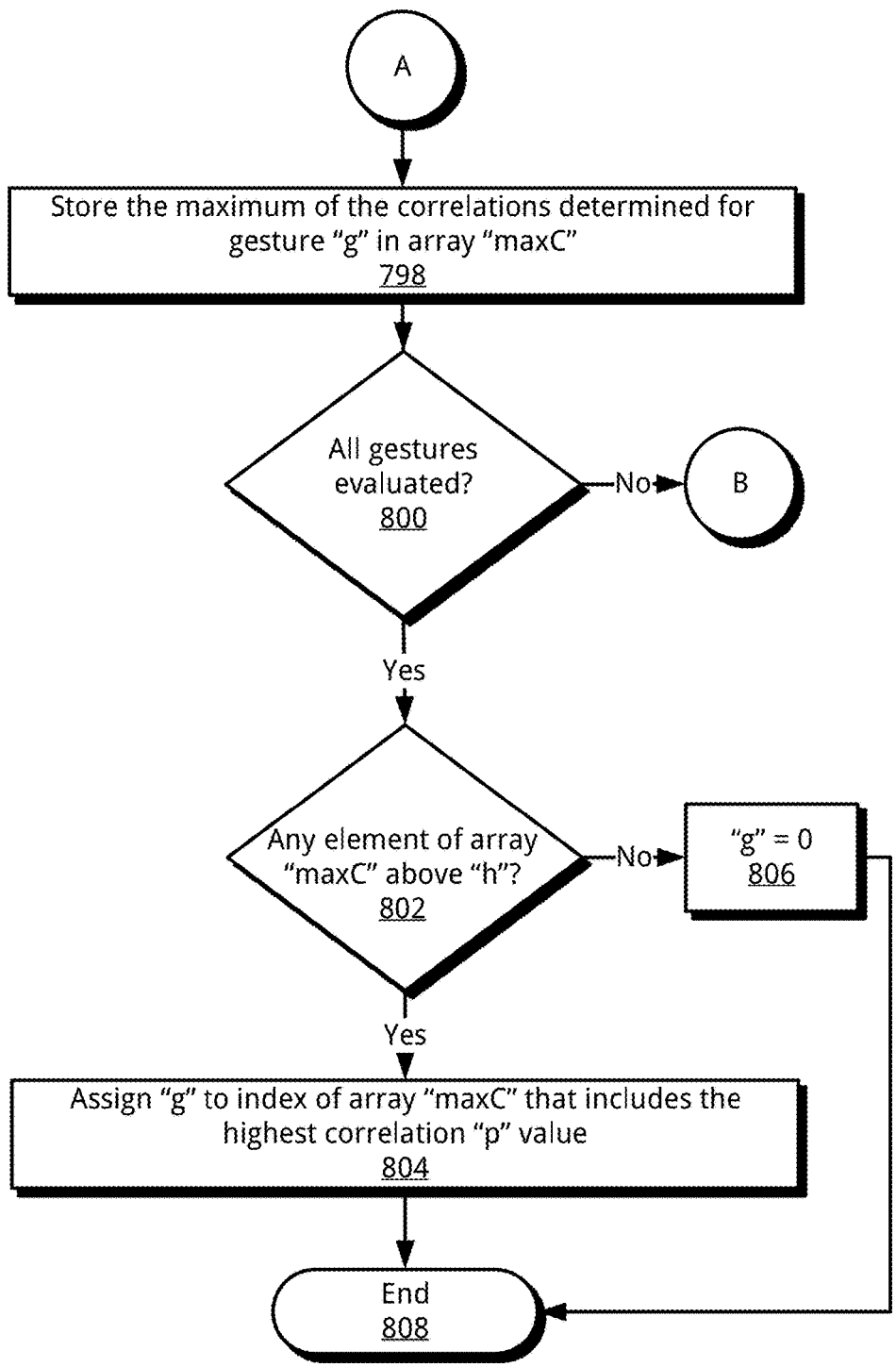

As discussed above with regard to FIG. 7A, the controller 102 may use one or more higher-power stages to perform gesture recognition after detection of probable gesture activity by the low-power stages. FIG. 7C shows one such example of a method 710 configured to classify a gesture based on correlating a digitized sensor signal with one or more reference waveforms stored in the gesture dictionary 114.

While the specific examples discussed below are directed to a virtual sensor signal, or a sensor signal comprising both a PZE and a PPMG component, this method is equally applicable to signals including just a PZE signal or a PPMG signal alone. Further note that while just one signal from each respective sensor type is discussed below, this disclosure is equally applicable with minor modification to use two or more digitized signals, such as those received from multiple PZE sensors or multiple PPMG sensors, or both. The method 710 begins in act 780.

In act 782, the controller 102 receives a probable gesture signal "s", a set of reference signals "refs" and a classification threshold "h". As discussed above with regard to FIG. 7A, the probable gesture signal "s" may be determined based on acts 704-708. The set of reference signals "refs" may be retrieved or otherwise accessed from the gesture dictionary 114. Further, the reference signals "refs" may be chosen based on the currently selected fit-level. For example, the controller 102 may select the particular reference signals/waveforms used for classification based on those reference signals being associated with the current fit-level. The reference signals "refs" may include a plurality of recognizable gestures "g" and one or more corresponding reference signals "r". The classification threshold "h" may be predetermined based on a desired detection sensitivity.

Note that the particular classification threshold chosen may impact the number "true accepts" which are the number of times the classifier correctly identifies the gesture, "false accepts" which are the number of times the classifier misclassifies the gesture (e.g., the gesture performed is A, but the classifier interprets it as B), and "false rejects" which are the number of times the classifier misses a gesture (e.g., the signal is a valid gesture, but the classifier interprets it as an invalid signal, or a non-gesture signal).

In the context of an approach that uses signal correlation, such as shown in FIG. 7C, then the classification threshold may accurately be described as a correlation threshold. Correlation, in a general sense, implies the degree signals "look alike", or their degree of similitude. Thus the range of correlation (and consequently the threshold) may start at a "minimum similitude" (e.g., 0) to "identical" (e.g., 1). Thus the effect of a threshold of 0 may cause the gesture classifier 120 to randomly assign a gesture to every signal, which maximizes false accepts. On the other hand, a threshold of 1 may cause the gesture classifier 120 to assign gestures only to those incoming signals that are identical to any of the reference signals. Thus, many gestures may be missed because they include a signal not identical to a reference signal. In any event, a particular threshold value chosen may be based, for example, on a user's particular preference, or based on balancing these concerns. For example, a correlation threshold of about 0.5+−0.25 may balance true accepts, false accepts and false rejects.

In at 784, the controller 102 determines/allocates a correlation matrix "c", with correlation matrix "c" being defined as a matrix having a size of the total number of gestures Ng by the total number of reference per gesture Nr. In act 786, the controller 102 determines an array for a correlation measure per gesture "maxC", with the array being defined by a size of Ng by 1.

In act 788, the controller 102 selects a gesture "g" from the set of reference signals "refs". In act 790, the controller 102 selects reference signal "r" of gesture "g". In act 792, the controller 102 performs correlation between "s" and "r" and, in act 794, stores a correlation value "p" in the correlation matrix "c" at position C(g, r). In some cases, correlation is performed based on the following equation:

$$(f*g)[n] \stackrel{def}{=} \sum_{m=0}^{n} f*[m]g[m+n] \qquad \text{Equation (1)}$$

where (f*) denotes the complex conjugate of f. Other calculations may also be suitable and are also within the scope of this disclosure. For example, a correlation calculation that functions on normalized waveforms may provide a degree of flexibility when determining similitude.

In act 796, the controller 102 determines if all references "r" of gesture "g" were evaluated. If so, the method 710 continues to act 798, otherwise the method 710 returns to act 790 and repeats acts 790-796. In act 798, the controller 102 stores the maximum of the correlations determined for gesture "g" in array "maxC" at position maxC(g).

In act 800, the controller 102 determines if all gestures within the one or more references signals "refs" were evaluated. If not, the method 710 returns to act 788 and selects the next gesture "g" to perform correlations against. Otherwise, the method 710 continues to act 802.

In act 802, the controller 102 determines if any element within array "maxC" is above the classification threshold "h" thus indicating that one or more gestures may be associated with the probable gesture signal "s". If no element within array "maxC" is above the classification threshold "h" the method 710 continues to act 806 and sets a flag "g" to zero (g=0) to indicate no classifications were determined for the probable gesture signal "s". Otherwise, the method 710 continues to act 804.

In act 804, the flag "g" is assigned the value that corresponds to the index of array "maxC" that includes the highest correlation "p" value. Stated differently, the flag "g" is set to a non-zero index that corresponds to the gesture with the highest correlation to the probable gesture signal "s". In act 808 the method 710 ends.

Figure 7E:
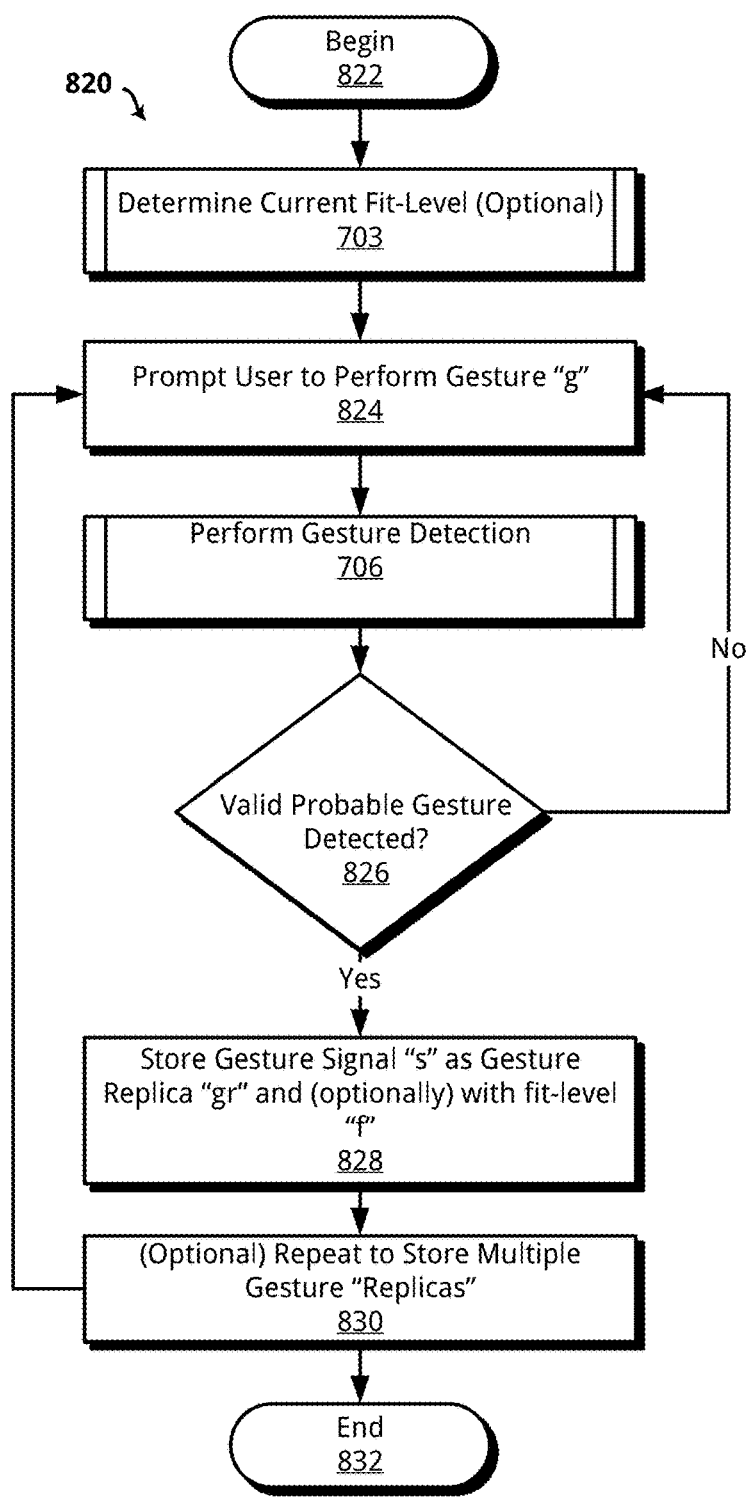
FIG. 7E shows an example method for calibrating/training recognizable gestures using the wearable gesture recognition device of FIGS. 1A-1C, in accordance with an embodiment of the present disclosure.

Now referring to FIG. 7E, one example method 820 for calibrating/training gestures is shown, in accordance with an embodiment of the present disclosure. Example method 820 may utilize a PZE signal alone, a PPMG signal alone, or both (e.g., the virtual sensor signal). The method 820 begins in act 822.

In act 703, the controller 102 may optionally determine the current-fit level, such as discussed above with reference to FIG. 7A. In act 824, the controller 102 prompts the user to perform gesture "g". In some cases, the controller 102 displays or causes to be displayed a visual prompt indicating a particular gesture to perform. Alternatively, or in addition to the visual prompt, the controller 102 may generate or cause to be generated an audible alert that instructs the user as to which gesture to perform (e.g., "perform a clapping gesture").

In act 706, the controller 102 may perform gesture detection substantially similar to that discussed above with regard to FIG. 7A. In act 826, the controller 102 determines if a valid probable gesture was detected. If so, the method 820 continues to act 828, otherwise the method 820 returns to act 824 and may again prompt the user to re-perform the gesture.

In act 828, the controller 102 stores gesture signal "s" as gesture replica "gr" within the one or more reference signals "refs" stored in the gesture dictionary 114. In some cases, the controller 102 stores gesture replica "gr" with an indicator of the fit-level it was captured with.

In act 830, the controller 102 may optionally perform acts 824 to 828 for X number of times to ensure a plurality of gesture replicas are captured for each particular gesture. In act 832 the method 820 ends.

Example Fit-Level Methodologies and Architecture

As previously discussed, PZE impedance variations may allow the controller 102 to determine or otherwise estimate fit-level. It should be appreciated that the specific method (e.g., real or imaginary part measurement) and the specific circuitry used will vary depending on the particular characteristics of the PZE sensor used. Thus the specific example methods and circuitry provided herein should not be construed as limiting and acts may be modified, augmented or otherwise omitted, as should be appreciated in light of this disclosure.

Figure 8A:
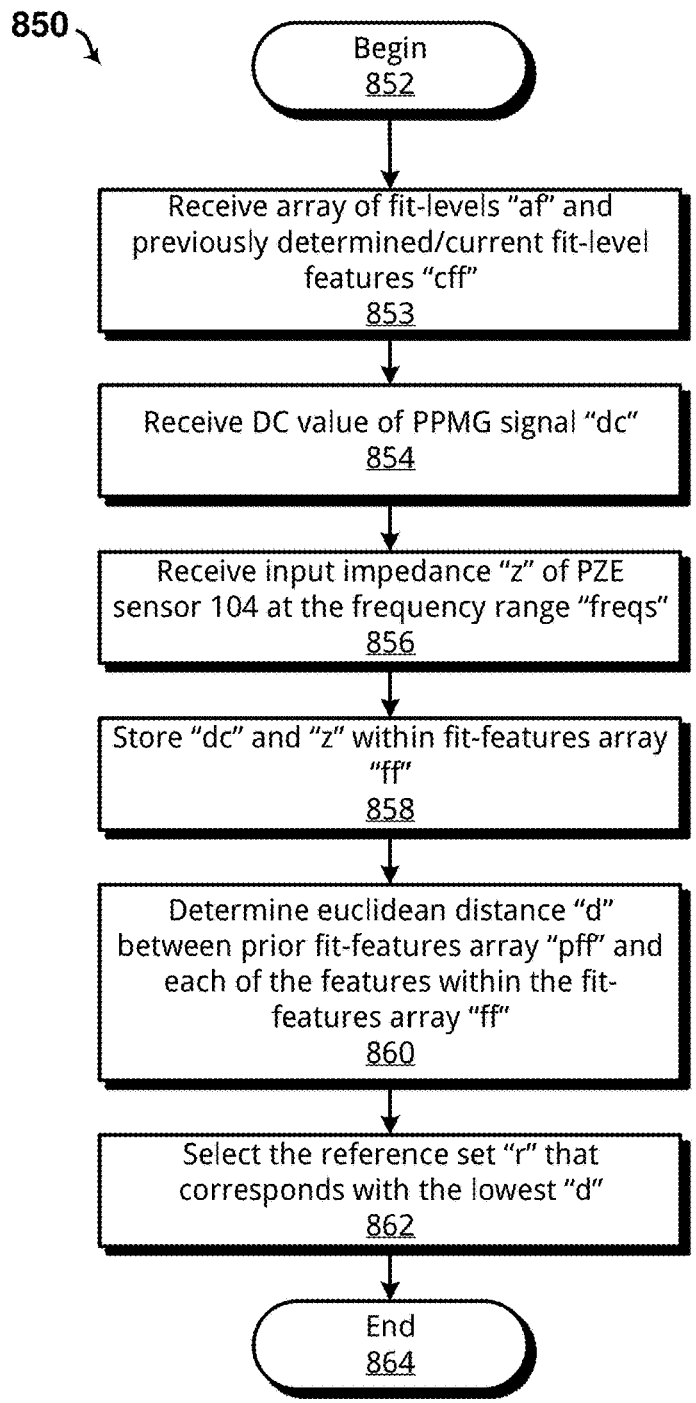
FIG. 8A shows an example method for determining a current fit-level using the wearable gesture recognition device of FIG. 1C, in accordance with an embodiment of the present disclosure.
Figure 8B:
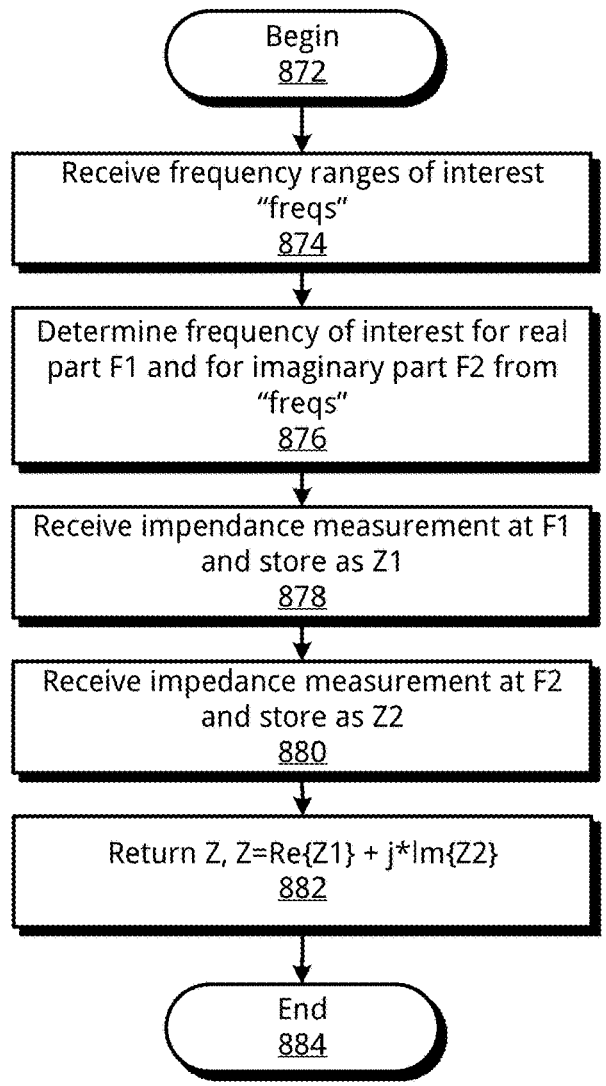
FIG. 8B shows an example method for measuring impedance of a PZE signal, in accordance with an embodiment of the present disclosure.

Now referring to FIG. 8A, one example method 850 for determining a current fit-level of a wearable gesture recognition device is shown, in accordance with an embodiment of the present disclosure. The method 850 begins in act 852.

In act 853, the controller 102 receives an array of fit-levels "af" (e.g., those fit-levels recognized by the controller 102) and previously determined/current fit-level features "cff".

In act 854, the controller 102 receives a DC value of a PPMG signal "dc". As should be appreciated the DC value of the PPMG signal is derivable by examination of the bytes within a digitized PPMG signal, or other suitable methods, as will be apparent in light of this disclosure.

In act 856, the controller 102 receives the input impedance "z" of the signal from the PZE sensor 104 at the frequency range "freqs." The frequency range "freqs" and the type of impedance measurement may be predetermined based on, for instance, the specific sensors used as previously discussed with reference to FIGS. 1C and 10A-10D. For the sake of providing one specific example, the following examples use a complex impedance of a PZE signal, although other embodiments will be apparent in light of this disclosure. Moreover, the example PZE impedance measuring method 856 discussed below may use, for instance, measurements at 3 MHz to 4 Mhz, although other frequencies are also within the scope of this disclosure. For example, a different sensor diameter may result in frequencies from 4 MHz to 5 MHz.

In act 858, the controller 102 stores the DC value of the PPMG signal "dc" and input impedance "z" within fit-features array "ff". In act 860, the controller 102 determines the Euclidean distance "d" between the current fit-features array "cff" and each of the features within the fit-features array "ff". Note the current fit-features array "cff" may have been previously determined based on the controller 102 performing periodic baseline measurements during prior performance of the method 850, for example.

In act 862, the controller 102 selects the particular reference set "r" from the array of fit-levels "af" that corresponds with the lowest "d". Stated differently, the controller 102 uses the measured impedance derived from the PZE signal to determine if fit-level has changed, and if so, selects the correct fit-level in accordance with that change. In act 864, the method 850 ends.

Referring now to FIG. 8B, one example method 856 for measuring impedance of a PZE signal is shown, in accordance with an embodiment. The method 856 may determine PZE impedance at two frequency ranges. For example, the method 856 may be used to measure a signal from PZE having diameter D1, such as shown in FIG. 10A-10B. In this case, the impedance measurement may be based on frequencies, for example, at 3-3.5 MHz, and again at 3.6-4 Mhz. The resulting determined impedance may then be a synthetic mix of real part at Frequency F1 and an imaginary part at Frequency F2. Note that Frequency F1 is not necessarily equal to Frequency F2.

In act 874, the controller 102 receives frequency ranges of interest "freqs". As previously discussed, the frequency ranges of interest "freqs" may be predetermined based on sensor characteristics. In act 876, the controller 102 receives an impedance measurement at Frequency F1 and stores the same as Z1. In act 880, the controller 102 receives an impedance measurement at F2 and stores the same as Z2. In act 882, the controller 102 returns Z, where Z is defined by the following equation:

$$Z = Re\{Z1\} + j*Im\{Z2\}$$  Equation (2)

where Z is the impedance, $Re\{Z1\}$ is the real part of Z1 an $Im\{Z2\}$ is the imaginary part of Z2.

As should be appreciated, other approaches are also equally applicable to the present disclosure. For instance, a measurement circuit may provide an impedance measurement for the PZE signal. The arrangement of measurement circuit 890 allows measurement of the imaginary part of the impedance of the PZE as an estimation of PZE "bonding integrity."

As described above, wearable gesture recognition devices 100A-C may be embodied in varying physical styles or form factors. In some embodiments, for example, the wearable gesture recognition devices 100A-C, or portions thereof, may be implemented as a mobile computing device having wireless capabilities. A mobile computing device may refer to any device having a processing system and a mobile power source or supply, such as one or more batteries, for instance. As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television smart device (e.g., smart phone, smart tablet, or smart television), mobile internet device (MID), messaging device, data communication device, and so on.

Examples of a mobile computing device also may include computers that are designed to be worn by a person, such as a wrist computer, finger computer, smart glasses, smart bracelets, smart fitness bands, ring computer, neck-pendant computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this regard.

Example System

Figure 16:
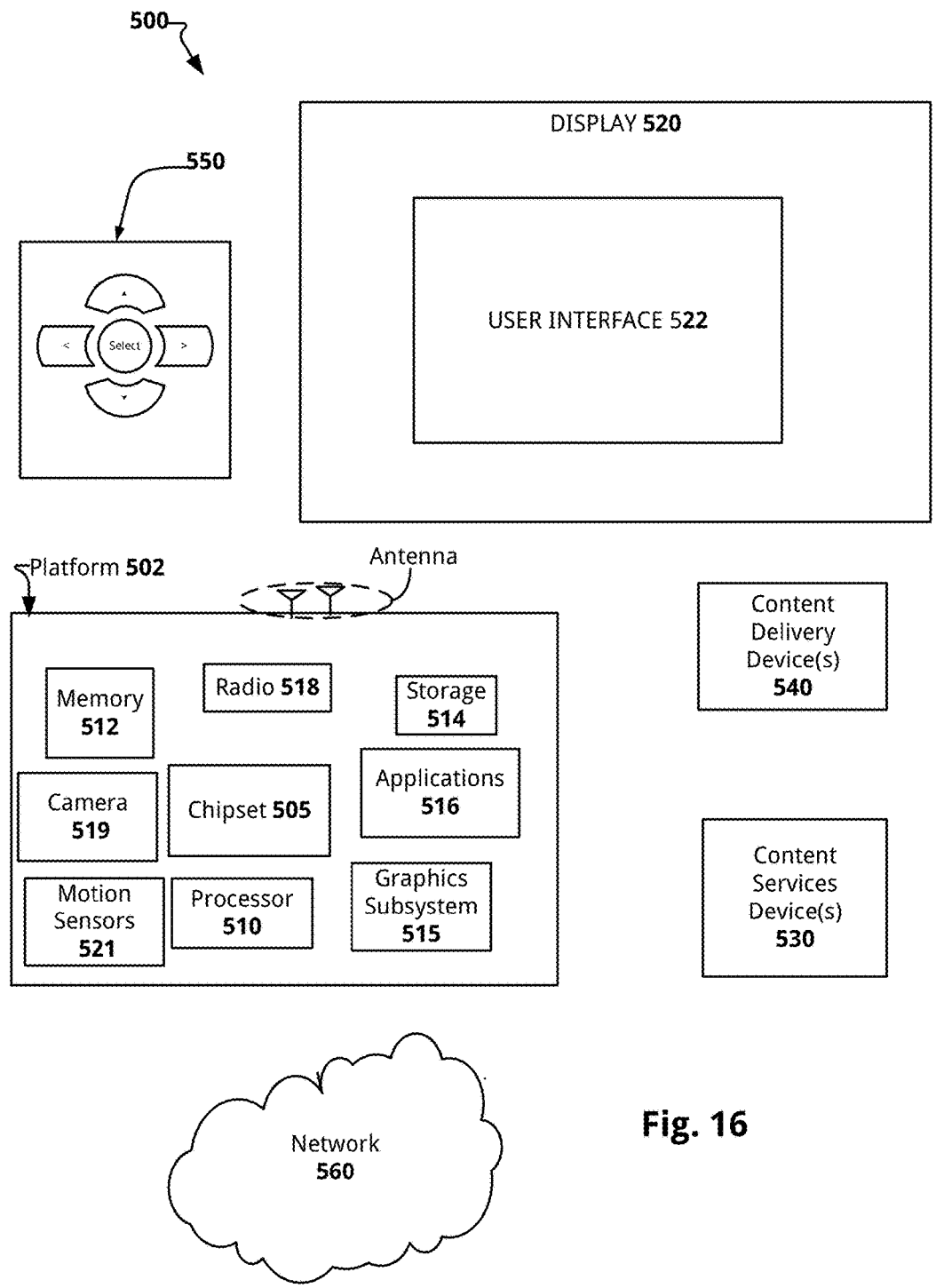
FIG. 16 shows a computing device configured to perform the methods of FIGS. 7A-8B, in accordance with an embodiment of the present disclosure.
Figure 17:
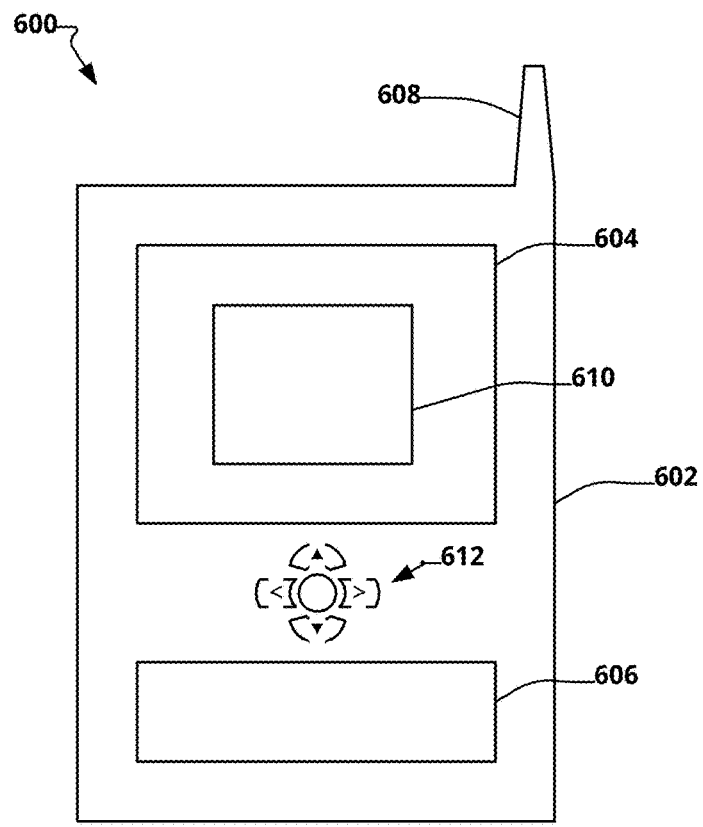
FIG. 17 shows a mobile computing system configured in accordance with an embodiment of the present disclosure.

FIG. 16 illustrates a computing system 500 implemented with gesture recognition device using the techniques disclosed herein, in accordance with various example embodiments. For example, system 500 may be incorporated into a personal computer (PC), laptop computer, wearable computing device, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520, so as to supplement navigational gesturing by the user. Each of these example components is described in more detail below.

In some embodiments, platform 502 may comprise any combination of a chipset 505, processor 510, memory 512, storage 514, graphics subsystem 815, camera 519, motion sensors 521, applications 516 and/or radio 518 or wireless transceiver circuit. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 510 may comprise dual-core processor(s), dual-core mobile processor(s), and so forth. Memory 512 may be implemented, for instance, as a volatile memory device such as, but not limited to, a Random Access Memory (RAM), Dynamic Random Access Memory (DRAM), or Static RAM (SRAM). Storage 514 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 514 may comprise technology to increase the storage performance enhanced protection for valuable digital media when multiple hard drives are included, for example.

Graphics subsystem 515 may perform processing of images such as still or video for display, and in some embodiments is configured to synthesize face images, as variously described herein. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 could be integrated into processor 510 or chipset 505. Graphics subsystem 515 could be a stand-alone card communicatively coupled to chipset 505. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In some embodiments, content services device(s) 530 may be hosted by any national, international and/or independent service and thus accessible to platform 502 via the Internet or other network, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520. In some embodiments, content services device(s) 530 may comprise a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, graphics, text, medical and gaming content, and so forth.

Content services device(s) 530 receives content such as cable television programming including media information, digital information, and/or other content. Examples of content providers may include any cable or satellite television or radio or Internet content providers. The provided examples are not meant to limit the present disclosure. In some embodiments, platform 502 may receive control signals from navigation controller 550 having one or more navigation features. The navigation features of controller 550 may be used to interact with user interface 522, for example. In some embodiments, navigation controller 550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 550 may be echoed on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In some embodiments, controller 550 may not be a separate component but integrated into platform 502 and/or display 520. Embodiments, however, are not limited to the elements or in the context shown or described herein, as will be appreciated.

In some embodiments, drivers (not shown) may comprise technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 when the platform is turned "off." In addition, chipset 505 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 5.

As described above, system 500 may be embodied in varying physical styles or form factors. FIG. 6 illustrates embodiments of a small form factor device 600 in which system 500 may be embodied. In some embodiments, for example, device 600 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, mobile electronic device 600 may comprise a housing 602, a display 604, an input/output (I/O) device 606, and an antenna 608. Device 600 also may comprise navigation features 612. Display 604 may comprise any suitable display unit for displaying information appropriate for a mobile computing device, which in one example embodiment is a touchscreen display. I/O device 606 may comprise any suitable I/O device for entering information into a mobile computing device. Examples for I/O device 606 may include an alphanumeric keyboard, a numeric keypad, a touch pad, input keys, buttons, a camera, switches, rocker switches, microphones, speakers, voice recognition device and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is a device comprising a photoplethysmographic (PPMG) sensor including at least one infrared light emitting diode (IR LED) and at least one photodetector, a PPMG power manager circuit configured to switchably supply power to the at least one IR LED of the PPMG sensor based in part on a predetermined duty cycle; and a controller including a gesture recognition mode configured to receive a PPMG signal from the PPMG sensor and determine an identified gesture represented therein based in part on comparing at least a portion of a waveform within the PPMG signal to one or more reference waveforms.

Example 2 includes the subject matter of Example 1, where the predetermined duty cycle is about 80% or less.

Example 3 includes the subject matter of any one of Examples 1-2, where the controller further includes at least one low-power stage configured to detect probable gesture activity prior to comparing the portion of the waveform within the PPMG signal to one or more reference waveforms.

Example 4 includes the subject matter of any one of Examples 1-3, wherein the at least one low-power stage is configured to detect probable gesture activity based at least in part on determining an average energy value for the PPMG signal exceeds a predetermined threshold value.

Example 5 includes the subject matter of any one of Examples 1-4, further comprising a gesture dictionary stored in a memory of the device and including at least one gesture identifier and at least one reference waveform corresponding to the at least one gesture identifier.

Example 6 includes the subject matter of any one of Examples 1-5, where each identified gesture is associated with a command that simulates at least one of a keyboard keypress, a mouse click, and a mouse click-and-hold.

Example 7 includes the subject matter of Example 6, further comprising a wireless transceiver circuit configured to communicatively couple to a remote computer via a communication network; wherein the controller is configured to cause the wireless transceiver circuit to send the command to the remote computer in response to determining the identified gesture is within the portion of the waveform within the PPMG signal.

Example 8 includes the subject matter of any one of Examples 1-7, where the controller is further configured to compare the portion of the waveform within the PPMG signal to one or more reference waveforms based on a signal correlation routine.

Example 9 includes the subject matter of any one of Examples 1-8, where the controller determines a correlation value for each reference signal based at least in part on comparing each reference signal to the portion of the waveform within the PPMG signal, and wherein a highest correlation value corresponds to the identified gesture.

Example 10 includes the subject matter of any one of Examples 1-9, where the PPMG power manager circuit includes a pulse width modulation (PWM) device configured to provide the predetermined duty cycle.

Example 11 is a wrist-watch device comprising the subject matter of any one of Examples 1-10.

Example 12 is a device comprising a photoplethysmographic (PPMG) sensor including at least one infrared light emitting diode (IR LED) and at least one photodetector, a piezoelectric (PZE) sensor, and a controller including a gesture recognition mode configured to receive a first signal from the PPMG sensor and a second signal from the PZE sensor, and determine an identified gesture based in part on comparing an aggregate waveform to one or more reference waveforms, the aggregate waveform including at least a portion of the first signal and the second signal.

Example 13 includes the subject matter of Example 12, where the controller includes a signal combiner configured to normalize at least a portion of each of the first and second signals and generate the aggregate waveform based on concatenating the normalized portions of the first and second signals.

Example 14 includes the subject matter of any one of Examples 12-13, where the controller is further configured to receive an impedance measurement for the second signal.

Example 15 includes the subject matter of Example 14, where the controller is further configured to determine a current fit-level based in part on the impedance measurement, and wherein the one or more reference waveforms correspond to the determined current fit-level.

Example 16 includes the subject matter of any one of Examples 14-15, further comprising an impedance measurement circuit, and wherein the impedance measurement circuit provides the impedance measurement.

Example 17 includes the subject matter of Example 14, where the controller is further configured to determine a current fit-level based in part on the impedance measurement, and provide an alert to a user when the determined current fit-level is different from a previously known fit-level.

Example 18 includes the subject matter of any one of Examples 12-17, wherein the PPMG sensor and the PZE sensor are housed in the same sensor housing.

Example 19 is a wrist-watch device comprising the subject matter of any one of Examples 12-18.

Example 20 is a wearable computing device comprising the subject matter of any one of Examples 12-18.

Example 21 is a computer-implemented method for gesture detection, the method comprising receiving, by a processor, a first signal from a photoplethysmographic (PPMG) sensor, receiving, by a processor, a second signal from a piezoelectric (PZE) sensor, and identifying, by a processor, a gesture based in part on comparing an aggregate waveform to one or more reference waveforms, the aggregate waveform including at least a portion of the first signal and the second signal.

Example 22 includes the subject matter of Example 21, further comprising determining a fit-level timer has elapsed, and in response thereto, receiving a current impedance measurement for the second signal.

Example 23 includes the subject matter of Example 22, wherein the fit-level timer includes a period of 30 seconds or less.

Example 24 includes the subject matter of any one of Examples 22-23, further comprising: determining a current fit-level based in part on the current impedance measurement, and wherein the one or more reference waveforms are associated with the determined current fit-level.

Example 25 includes the subject matter of Example 22, further comprising determining a current fit-level based at least in part on the current impedance measurement, and providing an alert to a user when the determined current fit-level is different from a previously known fit-level.

Example 26 is a sensor device comprising a piezoelectric (PZE) sensor, the PZE sensor comprising a first conductor and a second conductor, a PZE material layer adjoining the first and second conductors, and a photoplethysmographic (PPMG) sensor receptacle, a photoplethysmographic (PPMG) sensor, the PPMG sensor comprising an infrared light emitting diode (IR LED), a photodetector, where at least a portion of the PPMG sensor is disposed within the PPMG sensor receptacle.

Example 27 includes the subject matter of Example 26, where the PPMG sensor receptacle is defined by a through-hole that extends through each of the first conductor, the PZE material layer, and the second conductor.

Example 28 includes the subject matter of any one of Examples 26-27, further comprising a substrate layer made of a non-conductive material surrounding at least a portion of the PZE sensor and configured to provide structural support to the sensor device.

Example 29 includes the subject matter of any one of Examples 26-28, where the first and second conductors have a circular shape, and wherein the first conductor and the second conductor are concentric relative to each other.

Example 30 includes the subject matter of any one of Examples 26-29, where the PPMG receptacle is concentric to the first and second conductors.

Example 31 is a wrist-watch device comprising the subject matter of any one of Examples 26-30.

Example 32 is a wearable computing device comprising the subject matter of any one of Examples 26-30.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A device comprising: a photoplethysmographic (PPMG) sensor including at least one infrared light emitting diode (IR LED) and at least one photodetector, the PPMG sensor to couple to a user at a first body location and output a first signal;
    a piezoelectric (PZE) sensor to couple to the user at the first body location and output a second signal, the second signal representing mechanical vibrations caused by movement of the user;
    a memory having a gesture dictionary, the gesture dictionary to store at least a part of one or more reference waveforms; and
    a controller including a gesture recognition mode configured to receive the first signal from the PPMG sensor and the second signal from the PZE sensor, and determine an identified gesture based in part on comparing an aggregate waveform to the one or more reference waveforms, the aggregate waveform including at least a portion of the first signal and the second signal;
    wherein the PZE sensor includes at least one through-hole, wherein the at least one IR LED and the at least one photodetector are at least partially disposed within the through-hole.

2. The device of claim 1, wherein the controller is further configured to receive an impedance measurement for the second signal.

3. The device of claim 2, wherein the controller is further configured to determine a current fit-level based in part on the impedance measurement, and wherein the one or more reference waveforms correspond to the determined current fit-level.

4. The device of claim 2, wherein the controller is further configured to:
    determine a current fit-level based in part on the impedance measurement; and
    provide an alert to a user when the determined current fit-level is different from a previously known fit-level.

5. The device of claim 1, wherein the controller includes a signal combiner configured to normalize at least a portion of each of the first and second signals and generate the aggregate waveform based on concatenating the normalized portions of the first and second signals.

6. A computer-implemented method for gesture detection, the method comprising:
    receiving, by a processor, a first signal from a low-power stage, the low-power stage utilizing a piezoelectric (PZE) sensor, the PZE sensor to couple to a user at a first body location, wherein the first signal represents mechanical vibrations caused by movement of the user;
    detecting, by the processor, a probable gesture based on the first signal from the low- power stage;
    in response to detecting the probable gesture, receiving by the processor a second signal from a high-power stage, the high-power stage utilizing more power relative to the low-power stage and utilizing a photoplethysmographic (PPMG) sensor, the PPMG sensor to couple to the user at the first body location;
    and identifying, by a processor, a gesture based in part on comparing an aggregate waveform to one or more reference waveforms, the aggregate waveform including at least a portion of the first signal from the low-power stage and the second signal from the high-power stage.

7. The method of claim 6, further comprising determining a fit-level timer has elapsed, and in response thereto, receiving a current impedance measurement for the second signal.

8. The method of claim 7, further comprising:
    determining a current fit-level based in part on the current impedance measurement, and wherein the one or more reference waveforms are associated with the determined current fit-level.

9. The method of claim 7, further comprising:
    determining a current fit-level based at least in part on the current impedance measurement, and
    providing an alert to a user when the determined current fit-level is different from a previously known fit-level.

* * * * *